(12) United States Patent
Vennelakanti et al.

(10) Patent No.: US 9,957,781 B2
(45) Date of Patent: May 1, 2018

(54) OIL AND GAS RIG DATA AGGREGATION AND MODELING SYSTEM

(71) Applicant: HITACHI, LTD., Tokyo (JP)

(72) Inventors: Ravigopal Vennelakanti, Cupertino, CA (US); Umeshwar Dayal, Saratoga, CA (US); Chetan Gupta, San Mateo, CA (US)

(73) Assignee: Hitachi, Ltd., Tokyo (JP)

( * ) Notice: Subject to any disclaimer, the term of this patent is extended or adjusted under 35 U.S.C. 154(b) by 9 days.

(21) Appl. No.: 14/473,394

(22) Filed: Aug. 29, 2014

(65) Prior Publication Data

US 2015/0278407 A1 Oct. 1, 2015

Related U.S. Application Data

(63) Continuation-in-part of application No. PCT/US2014/032394, filed on Mar. 31, 2014.

(51) Int. Cl.
| | |
|---|---|
| *G01V 1/40* | (2006.01) |
| *E21B 43/00* | (2006.01) |
| *E21B 44/00* | (2006.01) |
| *E21B 49/00* | (2006.01) |

(52) U.S. Cl.
CPC .............. *E21B 43/00* (2013.01); *E21B 44/00* (2013.01); *E21B 49/003* (2013.01)

(58) Field of Classification Search
CPC .............. E21B 44/00; E21B 2041/0028; E21B 49/003; G06N 5/025
USPC ................................................... 702/6, 9, 13
See application file for complete search history.

(56) References Cited

U.S. PATENT DOCUMENTS

| | | | |
|---|---|---|---|
| 6,002,985 A | 12/1999 | Stephenson | |
| 6,012,016 A | 1/2000 | Bilden et al. | |
| 6,131,673 A * | 10/2000 | Goldman et al. | ............... 175/40 |
| 6,282,452 B1 | 8/2001 | DeGuzman et al. | |

(Continued)

FOREIGN PATENT DOCUMENTS

| | | |
|---|---|---|
| WO | 2007116008 | 10/2007 |
| WO | 2013052735 | 4/2013 |

(Continued)

OTHER PUBLICATIONS

International Search Report and Written Opinion received in International Application No. PCT/US2014/032394 dated Aug. 22, 2014.

*Primary Examiner* — An Do
(74) *Attorney, Agent, or Firm* — Mattingly & Malur, PC

(57) ABSTRACT

A management server is coupled to a plurality of rig systems by a network, each of the rig systems having a plurality of sensors, a rig and a rig node. The management server stores data received from at least one of the plurality of rig systems, the data including values associated with one or more attributes of the rig. The management server derives a model signature for at least one phase from a timeline for at least one rig system based on analytics of information stored in the database and the data, where the model signature includes a set of attributes for the at least one of the plurality of rig systems. In addition, the management server generates a recommendation including one or more actions for planning rig system management operations corresponding to at least one attribute of the set of attributes.

20 Claims, 26 Drawing Sheets

(56) References Cited

U.S. PATENT DOCUMENTS

| | | | |
|---|---|---|---|
| 6,519,568 B1 | 2/2003 | Harvey et al. | |
| 6,549,879 B1 | 4/2003 | Cullick et al. | |
| 6,907,375 B2 | 6/2005 | Guggari et al. | |
| 7,142,986 B2 | 11/2006 | Moran | |
| 7,577,527 B2 | 8/2009 | Vega Velasquez | |
| 7,894,991 B2 | 2/2011 | Del Castillo et al. | |
| 7,945,488 B2 | 5/2011 | Karr et al. | |
| 8,103,463 B2 * | 1/2012 | Kalgren et al. | 702/57 |
| 8,145,462 B2 | 3/2012 | Foucault | |
| 8,332,153 B2 | 12/2012 | Aamodt et al. | |
| 8,380,475 B2 | 2/2013 | Slipphaug et al. | |
| 8,532,968 B2 | 9/2013 | Oury et al. | |
| 2005/0149307 A1 * | 7/2005 | Gurpinar | E21B 43/00 703/10 |
| 2006/0239118 A1 | 10/2006 | Guidry et al. | |
| 2007/0185655 A1 * | 8/2007 | Le Bemadjiel | 702/6 |
| 2008/0294606 A1 | 11/2008 | Moran et al. | |
| 2009/0132458 A1 * | 5/2009 | Edwards et al. | 706/50 |
| 2009/0225630 A1 * | 9/2009 | Zheng et al. | 367/81 |
| 2010/0147510 A1 | 6/2010 | Kwok et al. | |
| 2011/0071963 A1 * | 3/2011 | Piovesan et al. | 706/11 |
| 2011/0098931 A1 | 4/2011 | Kosmala et al. | |
| 2011/0130914 A1 * | 6/2011 | Shah et al. | 701/30 |
| 2011/0174541 A1 * | 7/2011 | Strachan et al. | 175/27 |
| 2013/0035920 A1 * | 2/2013 | Al-Shammari | 703/10 |
| 2013/0161097 A1 * | 6/2013 | Benson et al. | 175/26 |
| 2014/0166274 A1 | 6/2014 | Weiner et al. | |

FOREIGN PATENT DOCUMENTS

| | | |
|---|---|---|
| WO | 2013188241 | 12/2013 |
| WO | 2014146004 | 9/2014 |
| WO | 2014150706 | 9/2014 |

* cited by examiner

| RIG ID | DATA ATTRIBUTE | TIMELINE | DATA |
|---|---|---|---|
| 42-501-00020-03-0 | DRILL T 'PE | DRILLING | Hydraulic rotary drilling |
| 38-363-00022-04-1 | MWD DEPTH | DRILLING | 265 m |
| 22-444-00031-01-3 | MONTHLY PRODUCTION – JUN 06 | PRODUCTION | 75 McF |
| .... | .... | .... | .... |

FIG. 10(a)

| RIG ID | DATA ATTRIBUTE | SIGNATURE TYPE - TIMELINE | SIGNATURE TYPE - SUBSYSTEM | RIG SIGNATURE DATA | RECOMMENDED SIGNATURE |
|---|---|---|---|---|---|
| 42-501-00020-03-0 | HOOKLOAD | DRILLING | DRILLING | 850 kgf | 1000 kgf |
| | MWD DEPTH | DRILLING | DRILLING | 260 m | 265 m |
| | ROTARY RPM | DRILLING | DRILLING | 60 RPM | 80 RPM |
| | .... | .... | .... | .... | .... |
| 22-444-00031-01-3 | MONTHLY PRODUCTION - JUN 06 | PRODUCTION | PRODUCTION | 75 McF | 76 McF |
| | HYDROSTATIC PRESSURE | PRODUCTION | CIRCULATION | 0.452 psi/ft | 0.433 psi/ft |
| | INJECTED WATER | PRODUCTION | INJECTION | 1000 L | 800 L |
| | .... | .... | .... | .... | .... |
| .... | .... | .... | .... | .... | .... |

FIG. 10(b)

| TIMELINE | SET OF KEY ATTRIBUTES |
|---|---|
| DRILLING | Hydraulic rotary drilling, MWD, Drill Mode, ... |
| PRODUCTION | Annular gas lift valve pressure, casing flow rate, ... |
| DRILLING | MWD, Pump Strokes/Minute, Mud Strokes, ... |
| .... | .... |

FIG. 10(c)

| KEY ATTRIBUTES | SUBSYSTEM |
|---|---|
| Hydraulic rotary drilling | DRILLING |
| Casing flow rate | CIRCULATION |
| Production Header Flow Rate | PRODUCTION |
| .... | .... |

FIG. 10(d)

| Sub-system Name | Independent Variables | Dependent Variables |
|---|---|---|
| Circulation System | Pump Strokes/Minute | Pump Pressure |
| | Total SPM | Flow |
| | Total Strokes | Lag Volume |
| | Mud circulation velocity | PUMP1SPM_spm |
| | Mud return volume | PUMP2SPM_spm |
| | | PUMP3SPM_spm |
| | | TOTALSPM_spm |
| | | Mud volume_In |
| Drilling System | Rotary RPM | Weight on Bit |
| | Block Height | Rate of Penetration |
| | Inclination | Mechanical Specific Energy |
| | Toolface | BITDEPTH_ft |
| | HOOKLOAD | TVDATBIT_ft |
| | ROTARYRPM | HOLEDEPTH_ft |
| | DRILLMODE | ROP_ft/hr |
| | MWDDEPTH | WOB_klbs |
| | BLOCKHEIGHT | TORQUE_ftlbs |
| | | STICKSLIP_rpm |
| | | POWERDRIVESHOCKRISK |
| | | SHOCKRISK |
| | | POWERDRIVESTICKSLIP_rpm |
| Well Test/Log System | Resistivity Deep Depth | Gamma corrected |
| | Resistivity Shallow Depth | Resistivity Shallow |
| | Gamma Depth | Total Gas |
| | Gas Totalizer Depth | Temperature |

FIG. 10(e)

OIL AND GAS RIG DATA AGGREGATION AND MODELING SYSTEM

BACKGROUND

Field

The example implementations relate to oil and gas rig systems, and more particularly to systems and apparatuses for data aggregation involving a plurality of rigs to facilitate recommendations for rig management.

Related Art

In the related art, oil and gas rigs utilize computerized systems to assist the operators of the rigs throughout the different phases of the oil or gas rigs. Such computer systems are deployed for the development of energy sources such as shale gas, oil sands, and deep water resources. In the related art, attention has shifted to the development of shale gas for supplying future energy needs. Related art advances in horizontal directional drilling and hydraulic fracturing technologies have unlocked the potential for recovering natural gas from shale to become a viable energy source.

However, the problem of maximizing output from an oil and gas reservoir, particularly shale gas reservoirs, is not well understood, even with the assistance from present computer systems. The process of making production decisions and sizing top-side facilities is mostly a manual process that depends on the judgment of the rig operator. Furthermore, operators often struggle with real time performance of support for down-hole gauges, semi-submersible pumps, and other equipment. Non-Productive Time (NPT) for a rig may constitute over 30% of the cost of drilling operations.

SUMMARY

Aspects of the present disclosure include a management server configured to be coupled to a plurality of rig systems by a network, each of the plurality of rig systems having a plurality of sensors, a rig and a rig node, the management server further operable to access a database. The management server may involve a memory configured to store data received from at least one of the plurality of rig systems, the data containing values associated with one or more attributes of the rig associated with the at least one of the plurality of rig systems and further configured to store a set of attributes for the at least one of the plurality of rig systems for generating a signature, the set of attributes including at least one attribute relating to a plurality of phases from a timeline, the timeline having a plurality of phases of operation for a rig; and a processor configured to derive a model signature for at least one phase from the timeline for the at least one of the plurality of rig systems based on analytics of information stored in the database and the data, the model signature including the set of attributes; and generate a recommendation including one or more actions for changing rig system management corresponding to the at least one attribute of the set of attributes for the at least one of the plurality of rig systems.

Aspects of the present disclosure include a computer program executed on a management server configured to be coupled to a plurality of rig systems by a network, each of the plurality of rig systems having a plurality of sensors, a rig and a rig node, the management server further operable to access a database. The computer program may have instructions including storing data received from at least one of the plurality of rig systems, the data having values associated with one or more attributes of the rig associated with the at least one of the plurality of rig systems; storing a set of attributes for the at least one of the plurality of rig systems for generating a signature, the set of attributes including at least one attribute relating to a plurality of phases from a timeline, the timeline having a plurality of phases of operation for a rig; deriving a model signature for at least one phase from the timeline for the at least one of the plurality of rig systems based on analytics of information stored in the database and the data, the model signature including the set of attributes; and generating a recommendation comprising one or more actions for changing rig system management corresponding to the at least one attribute of the set of attributes for the at least one of the plurality of rig systems.

Aspects of the present disclosure include a system, which may involve a plurality of rig systems, each of the plurality of rig systems having a plurality of sensors, a rig and a rig node; and a management server configured to be coupled to the plurality of rig systems by a network, the management server further operable to access a database. The management server may involve a memory configured to store data received from at least one of the plurality of rig systems, the data containing values associated with one or more attributes of the rig associated with the at least one of the plurality of rig systems and further configured to store a set of attributes for the at least one of the plurality of rig systems for generating a signature, the set of attributes including at least one attribute relating to plurality of phases from a timeline, the timeline having a plurality of phases of operation for a rig; and a processor configured to derive a model signature for at least one phase from the timeline for the at least one of the plurality of rig systems based on analytics of information stored in the database and the data, the model signature including the set of attributes; and generate a recommendation including one or more actions for changing rig system management corresponding to the at least one attribute of the set of attributes for the at least one of the plurality of rig systems.

BRIEF DESCRIPTION OF THE DRAWINGS

FIGS. 10(a) to 10(e) illustrate examples of management information utilized by the management server, in accordance with an example implementation.

DETAILED DESCRIPTION

Figure 1A:
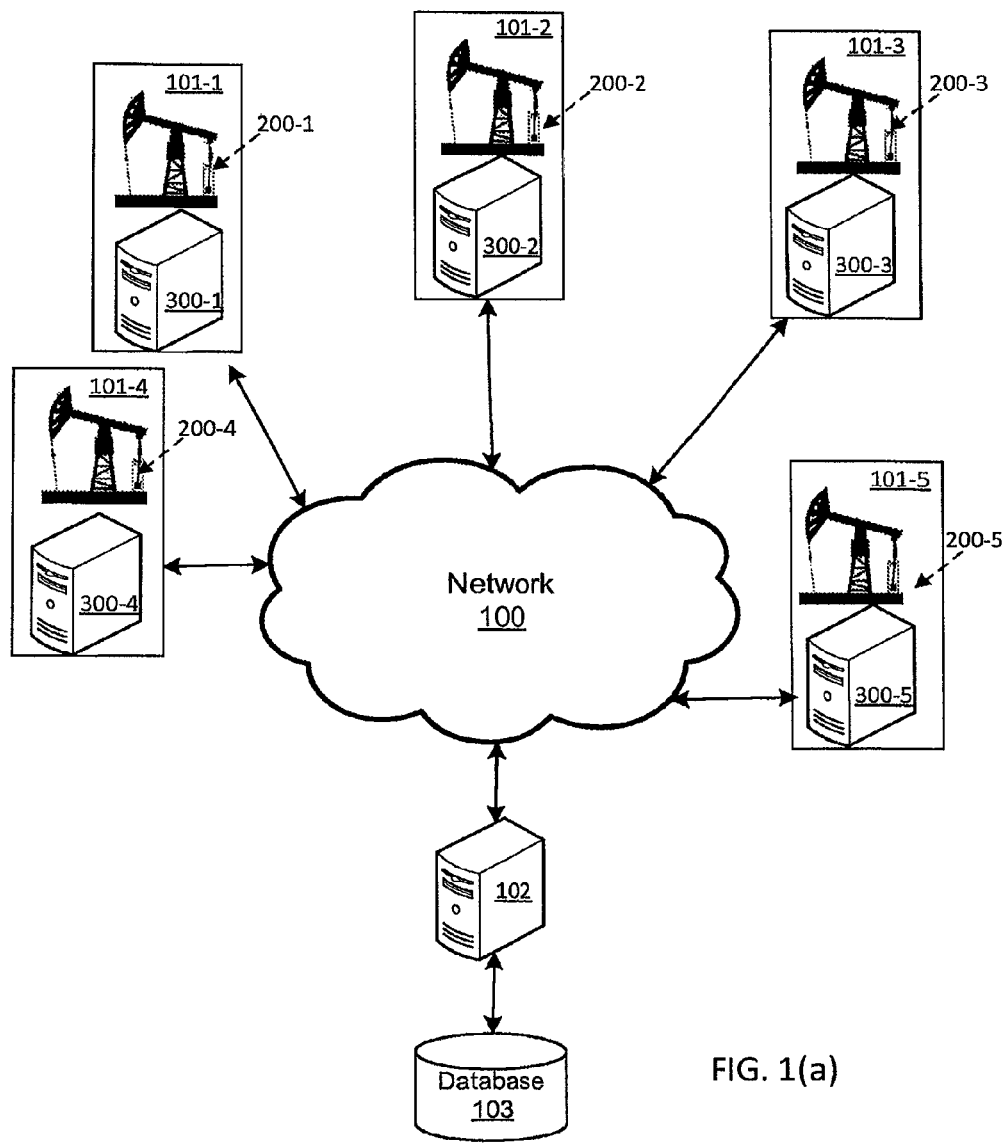
FIG. 1(a) illustrates a system involving a plurality of rig systems and a management server, in accordance with an example implementation.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application.

Example implementations described herein are directed to utilizing data analytics on data aggregated from a rig system to determine the signature of the rig system and facilitate recommendations to the rig system. Descriptive, predictive and prescriptive analytics may be applied which may impact the production cost, efficiency, and environmental impact of the rig system, depending on the desired implementation. Although the implementations described herein use a shale gas rig as an example, the present disclosure is not limited to a shale gas rig and the systems and methods described herein can be applied to other rigs in the oil and gas art as desired.

Example implementations are also applicable to shale oil and gas rig systems. Related art methods directed to developing complex geo physical reservoir models are insufficient for shale oil and gas reserves, as the structure of the reservoirs change significantly across the geology. In example implementations, cross dependent attributes over the timeline of the rig system are identified and signatures are generated to reduce NPT and increase production of the rig system despite the changes to the rig system over time.

Further, the related art has utilized data driven methods for leveraging analytics only in the form of bivariate analysis or multivariate analysis that combines at most two data streams, which can include either seismic data and micro seismic data or measurements from the completion system and the production system. In contrast, the example implementations provided herein utilize analytics by incorporating all forms of data sent from the rig system, and determine key attributes and affected sub systems to generate model signatures for the rig systems.

Figure 2:
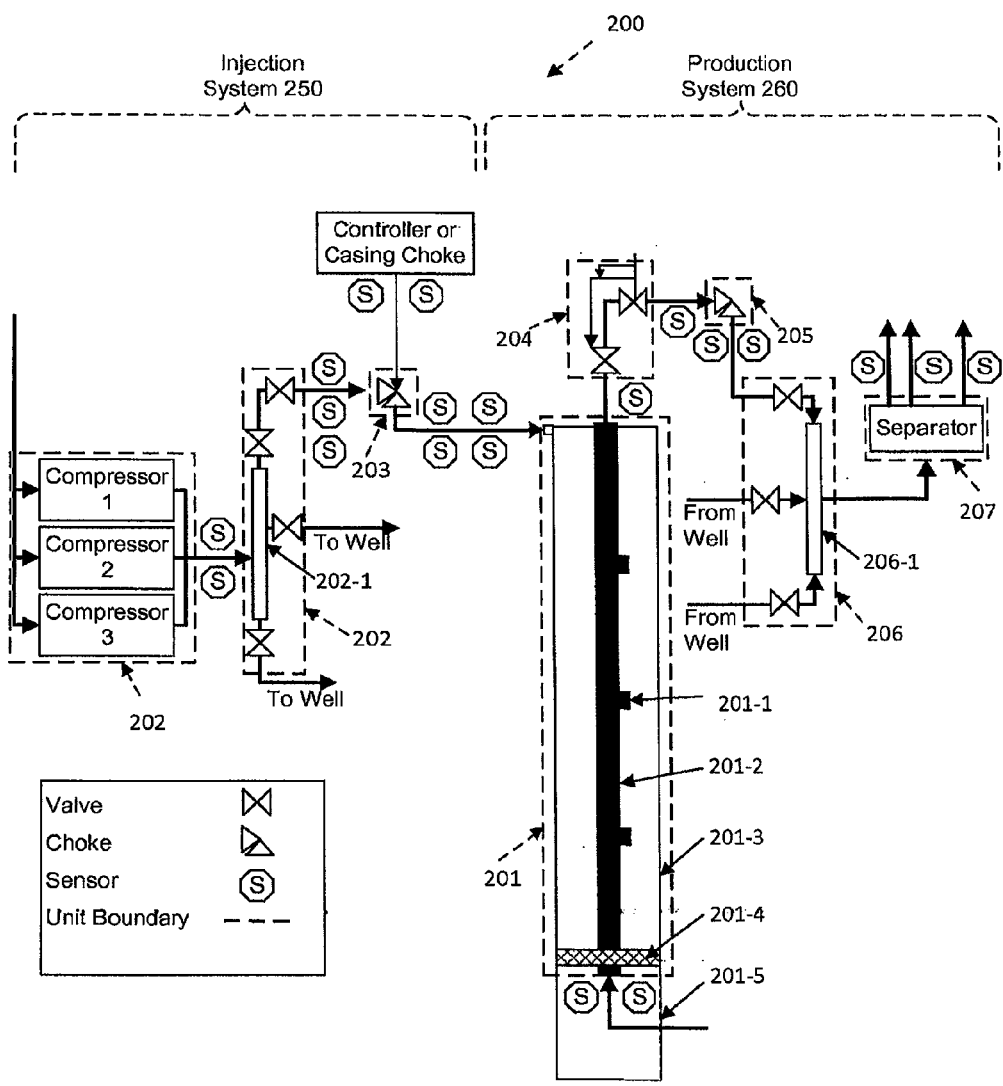
FIG. 2 illustrates a rig in accordance with an example implementation.
Figure 3:
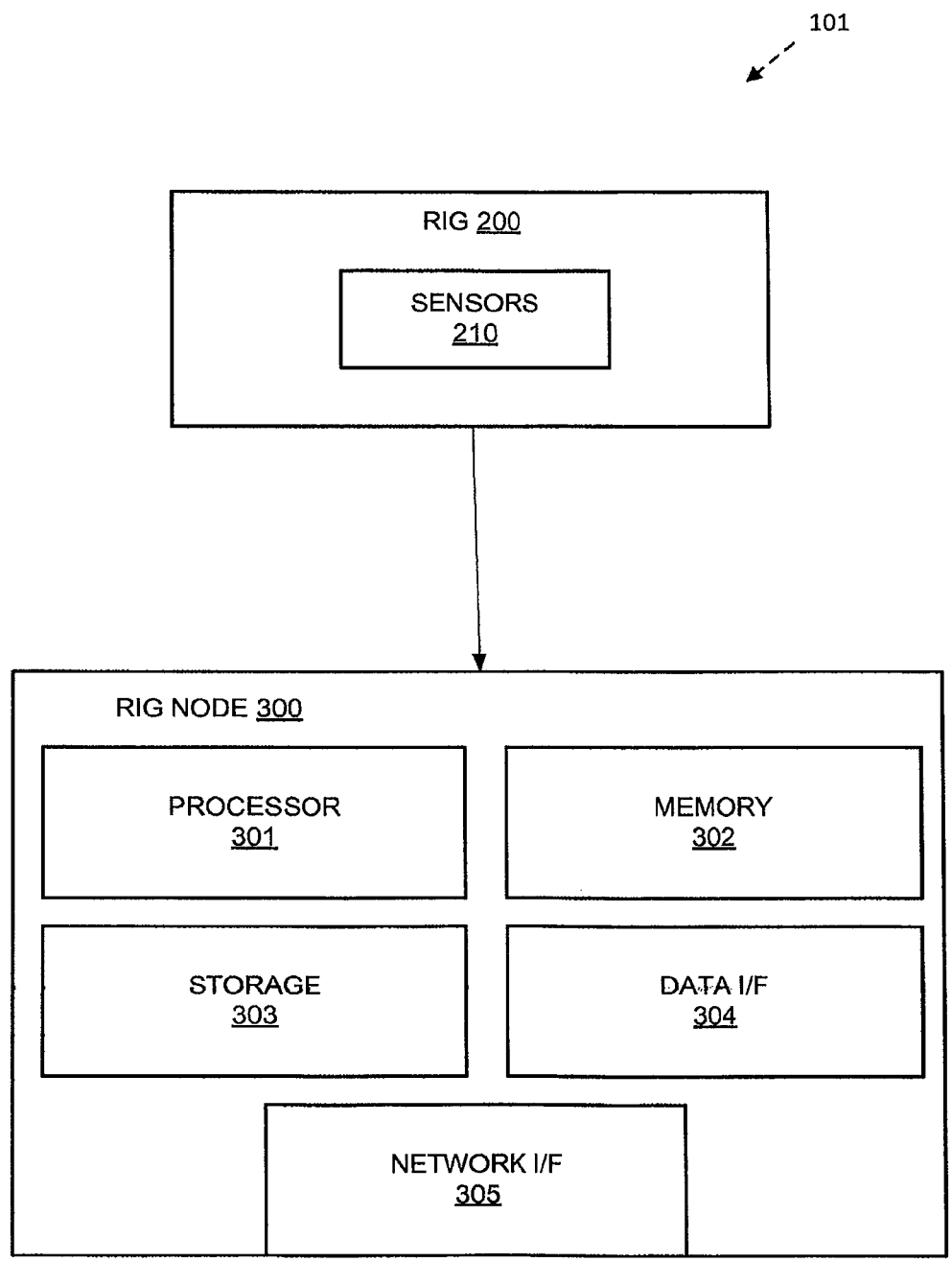
FIG. 3 illustrates an example configuration of a rig system, in accordance with an example implementation.

FIG. 1(a) illustrates a system involving a plurality of rig systems and a management server, in accordance with an example implementation. One or more rig systems 101-1, 101-2, 101-3, 101-4, and 101-5 can involve a corresponding rig 200-1, 200-2, 200-3, 200-4, 200-5 as illustrated in FIG. 2 along with a corresponding rig node 300-1, 300-2, 300-3, 300-4, and 300-5 as illustrated in FIG. 3. The rig systems are connected to a network 100 which is also connected to a management server 102. The management server 102 manages a database 103 which contains data aggregated from the rig systems in the network.

Figure 1B:
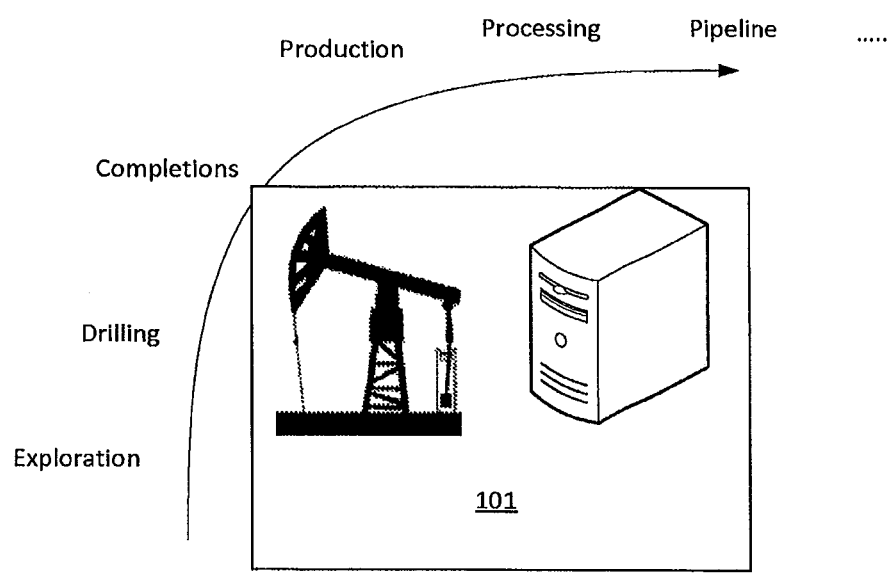
FIG. 1(b) illustrates an example timeline for a rig system, in accordance with an example implementation.

FIG. 1(b) illustrates an example timeline for a rig system, in accordance with an example implementation. The timeline for the rig system 101 may include multiple phases of rig operation. These phases can include an exploration phase, a drilling phase, a completions phase, a production phase, a processing phase and a pipeline phase. Example implementations may involve attributes associated with one or more of the phases of the timeline, depending on the desired implementation.

During the exploration phase, the well is initially drilled to determine whether reservoirs with oil or gas are present and the initial construction of the rig. In example implementations described herein, the rig node may be configured to assist the user in determining how to configure the rig and the parameters for the drilling during the exploration phase.

The drilling phase proceeds the exploration phase if promising amounts of oil and gas are confirmed from the exploration phase. During the drilling phase, the size and characteristics of the discovery are determined and technical information is utilized to allow for more optimal methods for recovery of the oil and gas. An appraisal drilling can be performed and a rig is established. In example implementations described herein, the rig node may be configured to assist the user in determining appropriate parameters for the drilling and assist in the management and obtaining of desired characteristics for the rig.

The completions phase is directed to the determination as to whether the well should be completed as a well or be abandoned as a dry hole. The completion phase transforms the drilled well into a producing well. During this phase, the casing of the rig may be constructed, along with the perforations. Various aspects of the construction of the rig, such as cementing, gravel packing and production tree installation may be employed. Sensors may be employed to determine various parameters for facilitating the completion of the rig, such as rate of flow, flow pressure and gas to oil ratio measurements.

The production phase proceeds the completions phase and is directed to the facilitation of production of oil or gas. The production phase includes the operation of wells and compressor stations or pump stations, waste management, and maintenance and replacement of facility components. Sensors may be utilized to observe the above operations, as well as determining environmental impacts from parameters such as sludge waste accumulation, noise, and so on. Example implementations described herein may provide feedback to rig system operators to maximize the production of the rig based on the use of model signatures.

During the processing and pipelining phase, the produced oil or gas is processed and transferred to refineries through a pipeline.

FIG. 2 illustrates a rig 200 in accordance with an example implementation. The example implementation depicted in FIG. 2 is directed to a shale gas rig, however, similar concepts can be employed at other types of rigs as well. The well 201 may include one or more gas lift valves 201-1 which are configured to control hydrostatic pressure of the tubing 201-2. Tubing 201-2 is configured to extract gas from the well 201. The well 201 may include a case 201-3 which can involve a pipe constructed within the borehole of the well. One or more packers 201-4 can be employed to isolate sections of the well 201. Perforations 201-5 within the casing 201-3 allow for a connection between the shale gas reservoir to the tubing 201-2.

The rig 200 may include multiple sub-systems directed to injection of material into the well 201 and to production of material from the well 201. For the injection system 250 of the rig 200, there may be a compressor system 202 that includes one or more compressors that are configured to inject material into the well such as air or water. A gas header system 202 may involve a gas header 202-1 and a series of valves to control the injection flow of the compressor system 202. A choke system 203 may include a controller or casing choke valve which is configured to reduce the flow of material into the well 201.

For the production system 260 of the rig 200, there may be a wing and master valve system 204 which contains one or more wing valves configured to control the flow of production of the well 201. A flowline choke system 205 may include a flowline choke to control flowline pressure from the well 201. A production header system 206 may employ a production header 206-1 and one or more valves to control the flow from the well 201, and to send produced fluids from the well 201 to either testing or production vessels. A separator system 207 may include one or more separators configured to separate material such as sand or silt from the material extracted from the well 201.

As illustrated in FIG. 2 various sensors may be applied throughout the rig to measure one or more parameters for a rig node, which are described in further detail below. These sensors provide feedback to the rig node which can interact with the system as illustrated in FIGS. 1(a) and 1(b).

FIG. 3 illustrates an example configuration of a rig system 101, in accordance with an example implementation. The rig system 101 includes a rig 200 as illustrated in FIG. 2 which contains a plurality of sensors 210. The rig system 101 includes a rig node 300 which may be in the form of a server or other computer device and can contain a processor 301, a memory 302, a storage 303, a data interface (I/F) 304 and a network I/F 305. The data I/F 304 interacts with the one or more sensors 210 of the rig 200 and store raw data in the storage 303, which can be sent to a management server for processing. The network I/F 305 provides an interface to connect to the network 100.

Figure 4:
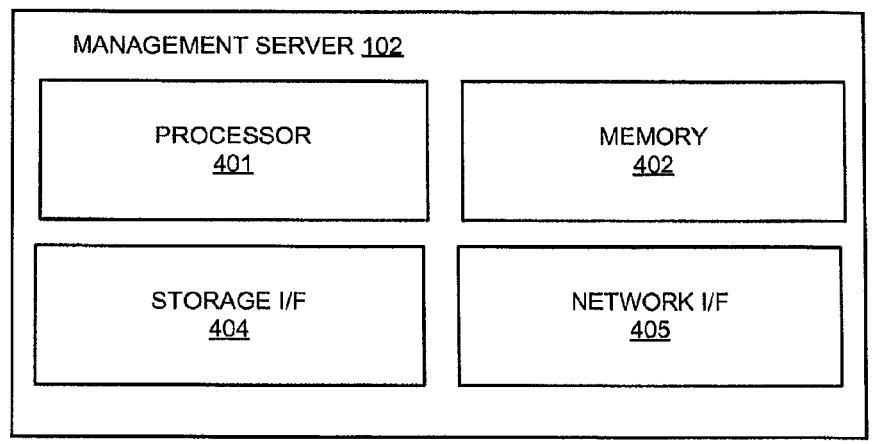
FIG. 4 illustrates a configuration of a management server, in accordance with an example implementation.
Figure 6:
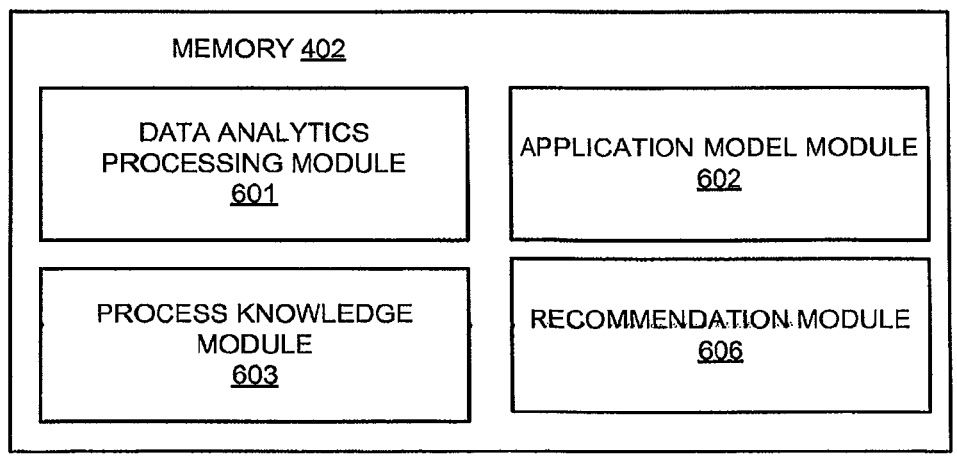
FIG. 6 illustrates an example configuration of modules stored in the memory of the management server, in accordance with an example implementation.

FIG. 4 illustrates a configuration of a management server 102, in accordance with an example implementation. Management server 102 may involve a processor 401, a memory 402, a storage I/F 404 and a network I/F 405. The processor 401 is configured to execute one or more modules in the memory 402 as illustrated in FIG. 6. The storage I/F 404 is the interface to facilitate connections between the management server 102 and the database 103. The network I/F 405 facilitates interactions between the management server 102 and the plurality of rig systems. Data is aggregated to the management server by the network I/F and then subsequently stored in the database for future analytics.

Figure 5:
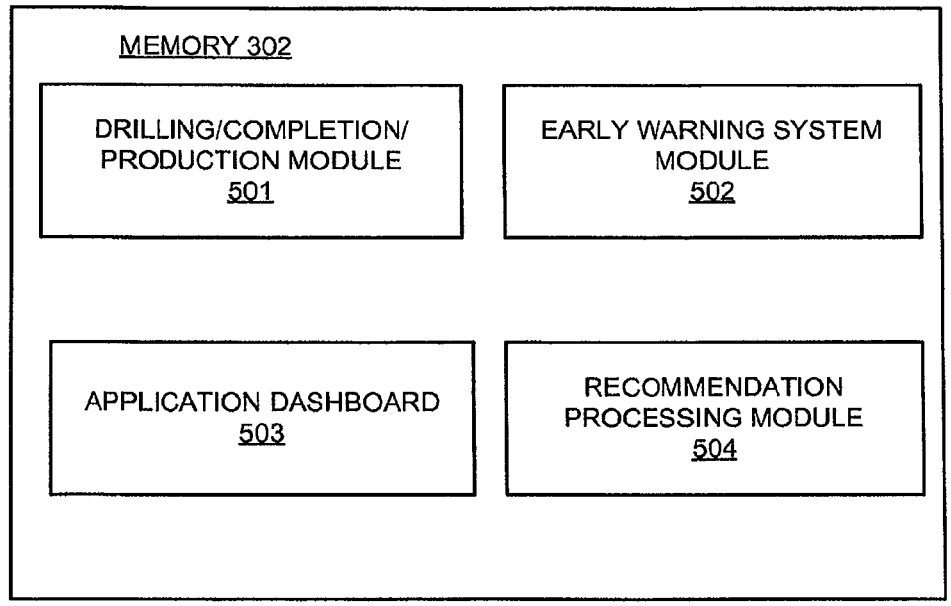
FIG. 5 illustrates an example configuration of modules stored in the memory of the rig node, in accordance with an example implementation.

FIG. 5 illustrates an example configuration of modules stored in the memory of the rig node, in accordance with an example implementation. The modules that may be included in memory 302 include the drilling/completion/production module 501, the early warning system module 502, the application dashboard 503 and the recommendation processing module 504. The drilling/completion/production module 501 is directed to processing sensor measurements related to the drilling, completion and production aspects of the rig and sending the information to the management server 102. The early warning system module 502 can process recommendations from the recommendation processing module 504 for correcting courses of action that may lead to increased NPT or other erroneous courses of action based on the application model of the recommendation processing module 504. The application dashboard 503 facilitates a user interface for providing recommendations and can provide a dashboard or metering interface to illustrate the attributes of the rig along with recommended course of actions based on the recommendation processing module. The recommendation processing module 504 is directed to providing suggestions and courses of actions to the application dashboard. The recommendation processing module 504 can accomplish this by receiving recommendations from the management server 102 or by receiving an application model package from the management server 102 and utilizing the application model to provide an application model for the particular rig.

FIG. 6 illustrates an example configuration of modules stored in the memory 402 of the management server, in accordance with an example implementation. The memory 402 may include a data analytics processing module 601, an application model module 602, a process knowledge module 603 and a recommendation module 606. The data analytics processing module 601 is configured to perform one or more analytics as illustrated in further detail in FIG. 8(a), FIG. 12 and FIG. 13. The application model module 602 may provide application services as described in further detail in FIG. 8(a). The process knowledge module 603 is configured to provide one or more process tools for discovery models and establishing metrics. The recommendation module 606 may generate recommendations to the associated rig systems or provide information for each of the rig systems to generate their own models. These modules may contain one or more functions in an architecture as illustrated in FIG. 8(a).

Figure 7:
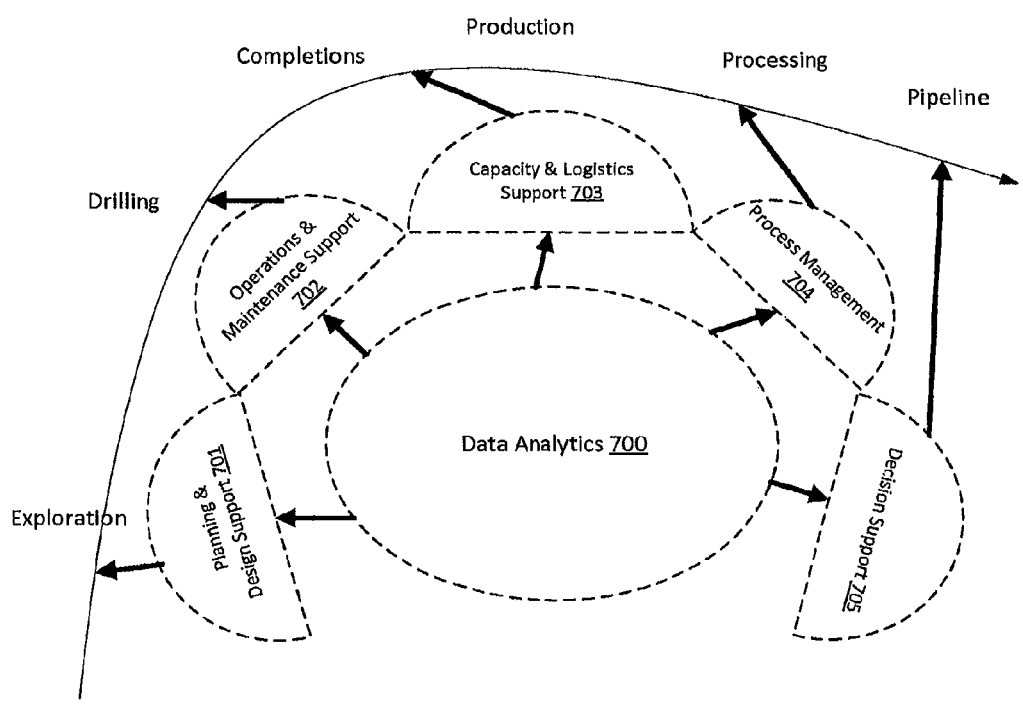
FIG. 7 illustrates an example output architecture by applying data analytics, in accordance with an example implementation.
Figure 19:
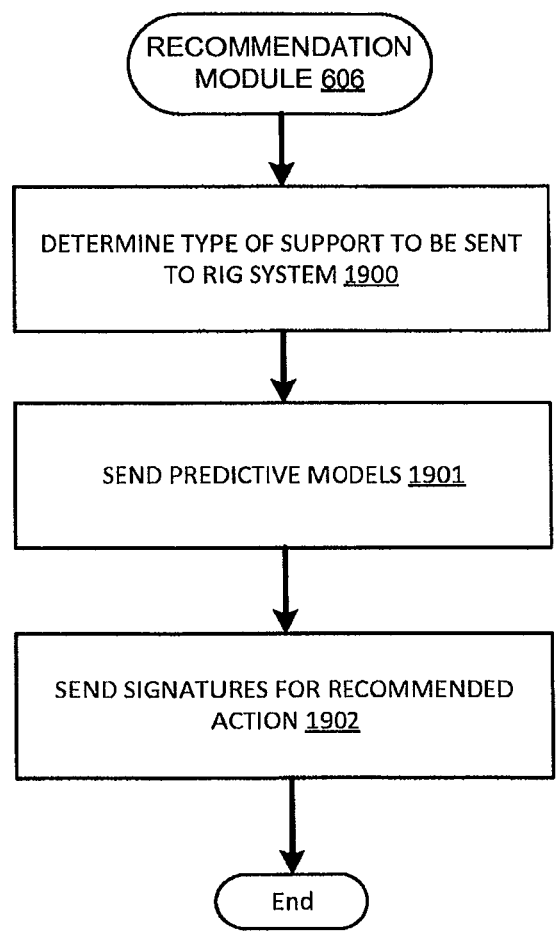

FIG. 7 illustrates an example output architecture by applying data analytics, in accordance with an example implementation. By utilizing the data analytics as described in the disclosure, various output can be possible. For example, planning and design support 701 can include providing planning and design of the rig based on attributes of a rig in an exploration phase, while analyzing past rigs to determine an appropriate model for the rig. Operations and maintenance support 702 can include aspects of the drilling phase and indications of parameters to optimize the rig during the drilling phase. Capacity and logistics support 703 can include schemes for managing the capacity and logistics during the production and completions phase of the rig. Process management 704 can include providing optimized attributes for the processing of the oil and gas during the production and completions phase. Decision support 705 can provide decisions for the rig throughout the rig lifetime. The examples of FIG. 7 can be extended to other solutions, depending on the desired implementation. The output can be provided at appropriate phases during the time line depending on the desired implementation and as illustrated in FIG. 19.

Figure 8A:
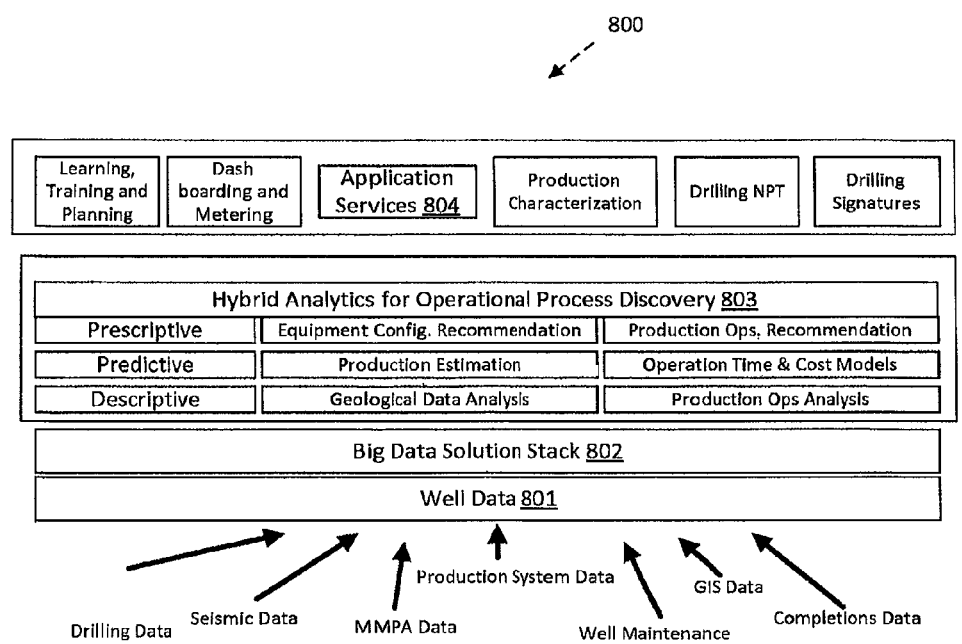
FIG. 8(a) illustrates an example high level architecture of the data analytics of the management server, in accordance with an example implementation.

FIG. 8(a) illustrates an example high level architecture 800 of the data analytics of the management server, in accordance with an example implementation. On the lower layer 801, well data is aggregated which can include drilling data, seismic data, data regarding environmental compliance of the Marine Mammal Protection Act (MMPA), production system data, well maintenance data, Geographic Information Systems (GIS) data and completions data. Other data may be aggregated depending on the desired implementation. For example, data such as geological and special data, event data, industry models, contracts data and so forth may be included according to the desired implementation. Each rig system operator may determine the type of information to submit to the management server for data analytics. The data is processed in the big data solution stack layer 802 so that analytics can be performed in the analytics layer 803.

Figure 13:
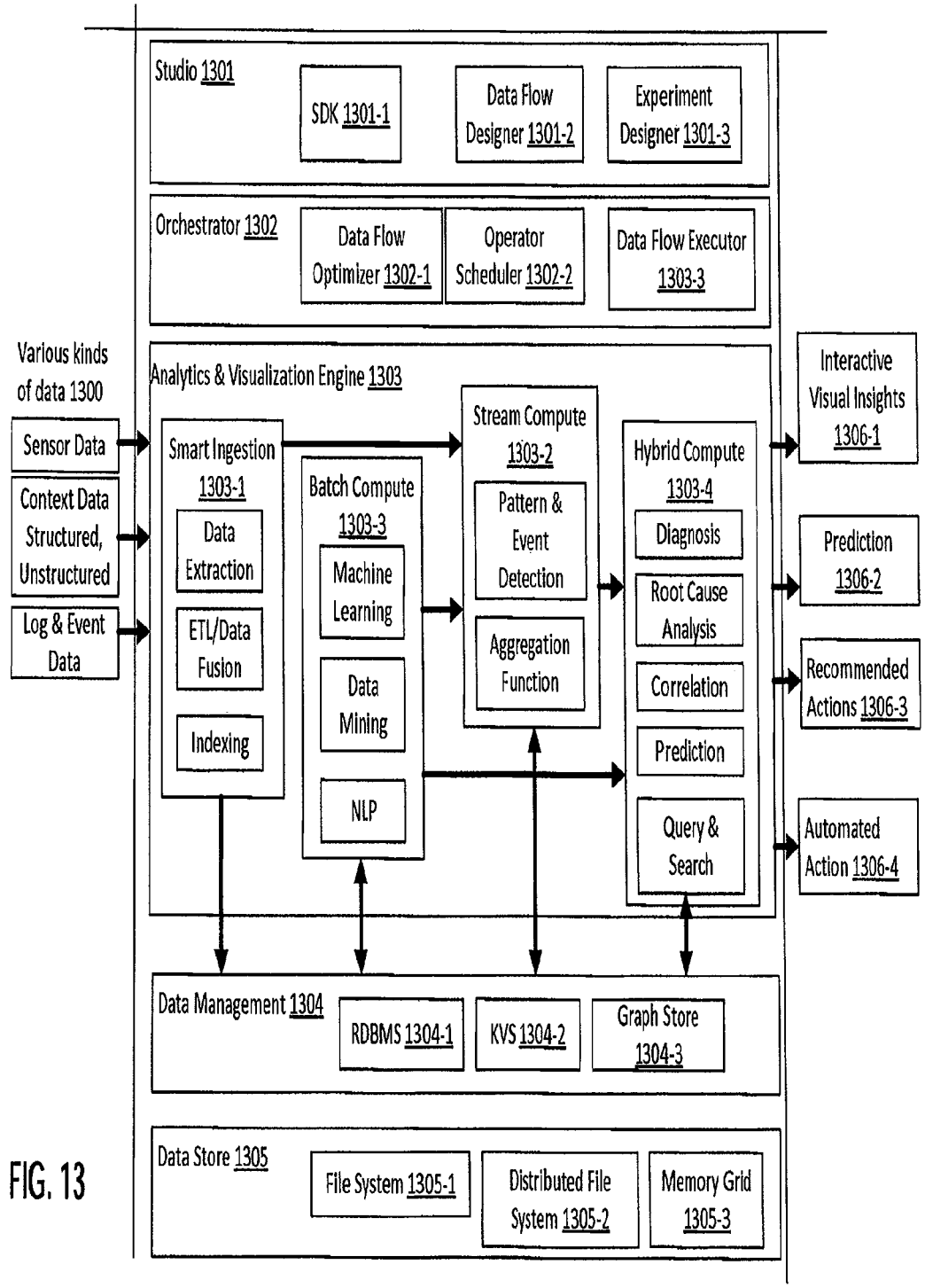
FIG. 13 illustrates an example high level architecture of data analytics, management and feedback to rig systems in accordance with an example implementation.

Preprocessing may be performed in the big data solution stack layer 802 in a manner as further illustrated in FIG. 13. Many tools and functions may be provided by the layer, including data integration and loading functions, schema integration functions, normalization functions, data transformation functions, ontologies to determine classes, meta data mapping, windowing, sizing and indexing functions. Depending on the desired implementation, other data processing functions known in the art may also be included.

Analytics layer 803 can be applied to perform hybrid analytics for operational process discovery. The analytics layer 803 can include prescriptive, predictive and descriptive analytics. Descriptive analytics can involve creating models for deployments in the rig nodes and can involve geological data analysis and production operation analysis. The descriptive analytics can integrate the onsite or near field data sets of an individual rig into the rig node. Predictive analytics can involve providing event detection functions for the individual rigs. Such analytics can involve production estimation, operation time and cost models. Prescriptive analytics can involve directing a course of action to the individual rig operator and can involve equipment configuration recommendations and production operation recommendations.

Example of analytics functions can include meta-data mapping, threshold setting, and pivoting where a pivot table is formed to sort or perform calculations of the data. Other functions can also include filtering, classification specification clustering thresholds, joins, similarity thresholds, data transformations, statistical computation, data sequencing, trending, principle component analysis, motif mining, event analysis/complex event processing, event correlation, event impact analysis and prediction, seasonality detection, extreme value detection, correlation of time series, analysis of variance, clustering TS segments, determining nearest neighbor time series segment, finding similar occurrences of time series, cleansing/conditioning, data characterization and profiling, focusing, causal analysis—pattern detection, incorporation of business rules models, data set profiling, interest driven focusing and callouts to external domain models. The functions are example and may be utilized, omitted, or other functions may also be incorporated depending on the type of analytics to be performed and the desired implementation.

The application model module 602 may manage an application services layer 804, which may involve the creation of one or more models for application to each individual rig and applications to provide the information to the rig operator. The models can be provided by dash boarding and metering applications that can provide analytical and visual dashboards of the models. Learning, training and planning applications can also be utilized to provide recommended courses of action. Examples of application models include drilling NPT, condition based maintenance drilling signatures, geosteering analysis, asset operations lifecycle management, production characterization, flow characteristics, and inventory and supply chain integration models. For example, geosteering analysis can be directed to the creation of models to adjust the borehole position of the rig.

Other applications can also be included in the application services layer 804, depending on the desired implementation. For example, drilling and fracking applications may be applied for drilling and fracking operations. For production operation applications, examples can include applications for determining bottom hole assembly, well bore systems, well head/blowout preventer (BOP) risers, enhanced oil recovery and water flood. In relation to well operations, there can be applications for modeling and determining well production for horizontal and multilateral wells, heavy oil production, and so forth). An application for extracting hydrocarbon processing context data can be used to process well logs, production history, and work over details. Applications ffor optimization & well profitability can include functions for trend analysis, alarm combinations, correlative analysis key performance and metrics index alerts, and heavy oil production.

Figure 8B:
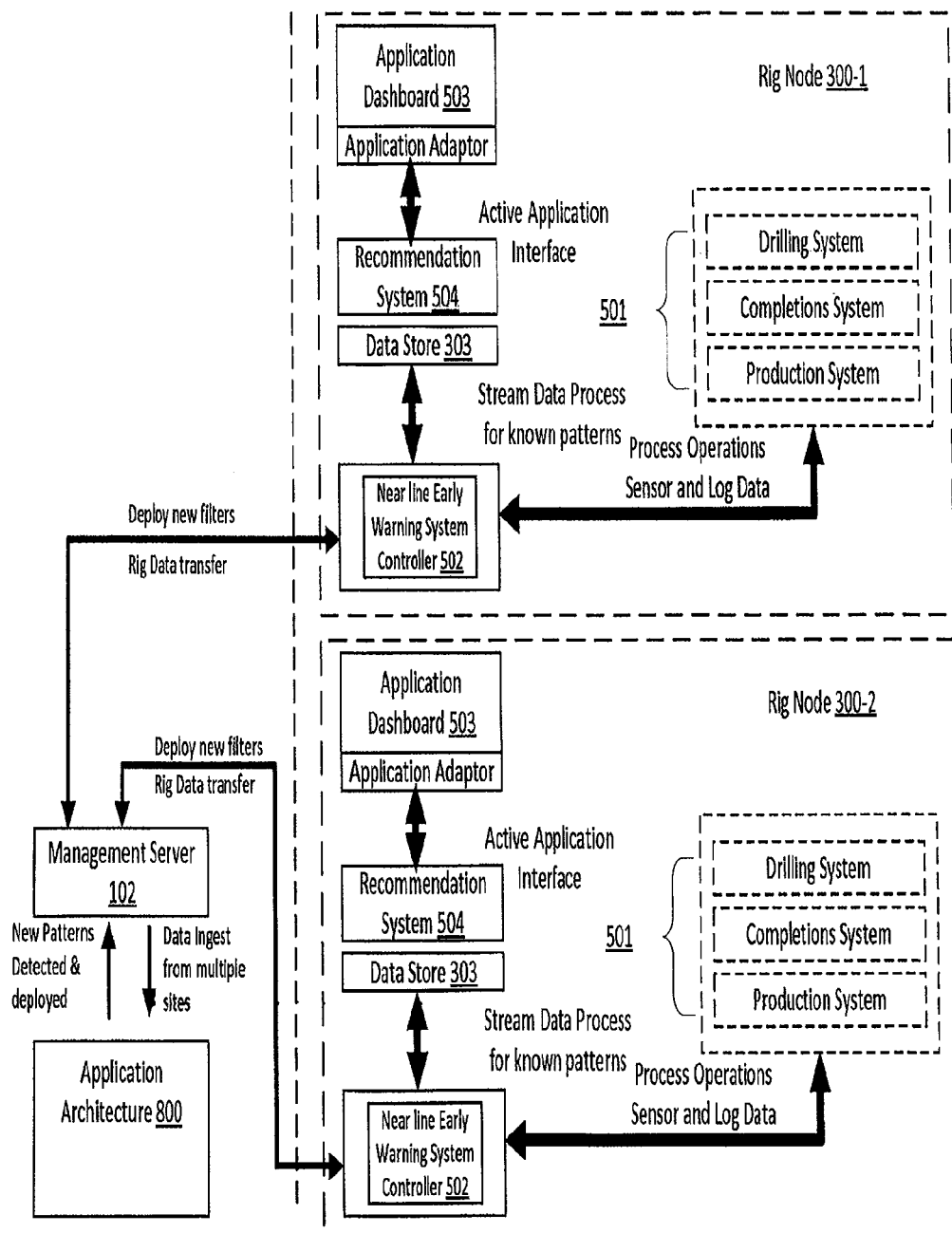
FIG. 8(b) illustrates an example architecture between the management server and the rig system, in accordance with an example implementation.
Figure 8C:
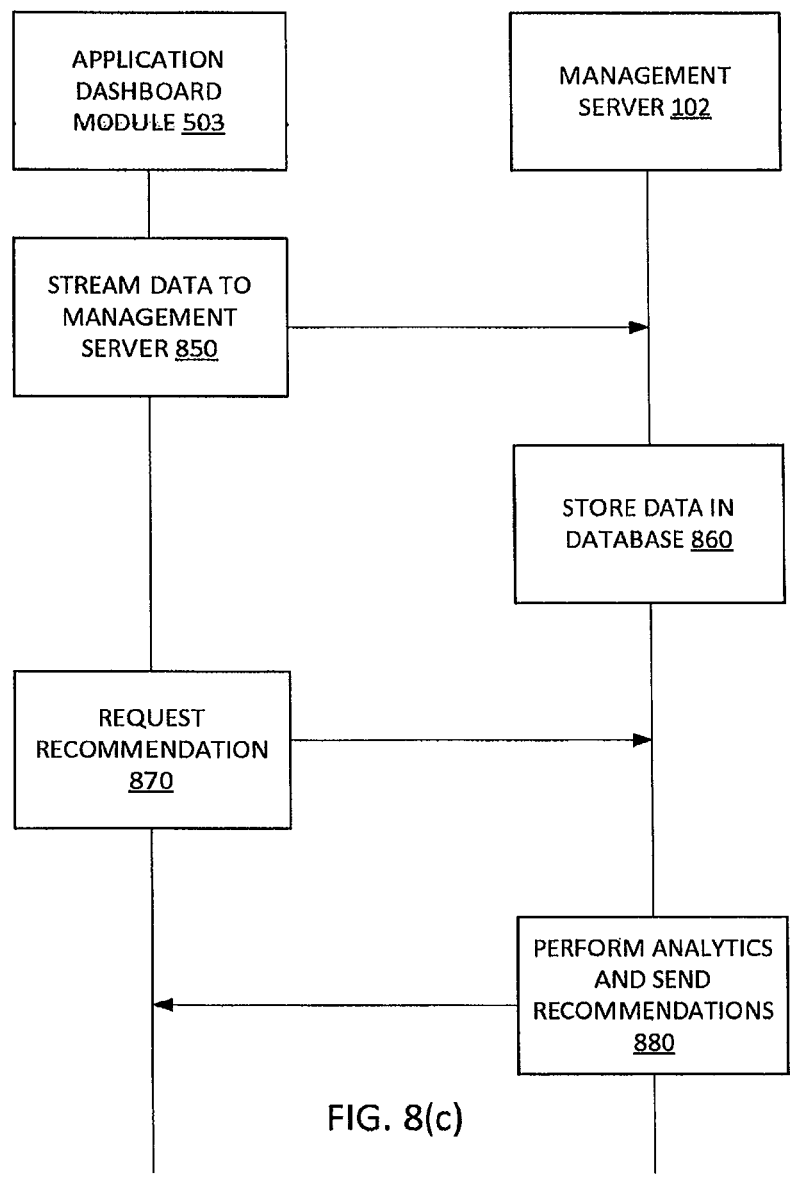
FIG. 8(c) illustrates an example flow diagram between the application dashboard of a rig system and a management server, in accordance with an example implementation.

FIG. 8(*b*) illustrates an example architecture between the management server 102 and various rig nodes. In the architecture between the management server and the rig system, descriptive and predictive analytics are utilized to facilitate model deployment to the rig node systems for event detection.

In the illustration of FIG. 8(*b*), rig nodes 300-1 and 300-2 are used as an example with the remaining rig nodes from FIG. 1(*a*) omitted for clarity. The application architecture 800 as illustrated in FIG. 8(*a*) is executed by the management server 102 and is configured to ingest data from multiple sites and conduct analytics. When new patterns are detected or model signatures are derived, then the results are utilized by the management server 102 for providing recommendations to each of the rig nodes 300-1 and 300-2. The management server 102 is communicatively coupled to the rig nodes 300-1 and 300-2, wherein data from the rig is transferred from the rig nodes 300-1 and 300-2 to the management server 102.

When the management server 102 determines model signatures or new attribute correlations from the application architecture 800, the management server can send the information to the rig nodes 300-1 and 300-2. The information can include the deploying of new filters to the early warning system controller 502 of the rig nodes. The filters are used by the early warning system controller 502 which can utilized the updated filters to correct erroneous actions by the rig node and interact with the recommendation system 504 to generate recommendations based on the new filters. The recommendations can be sent to the rig node operator through the application dashboard 503.

Within each of the rig nodes 300-1 and 300-2, the early warning system controller 502 is configured to receive the sensor and log data of the operations of the subsystems of the rig. The data is obtained from the sensors of the rig and is parsed by the drilling/completion/production module 501. The data is also parsed by the early warning system controller 502 for monitoring the situation at the rig and to retrieve recommendations from the recommendation module 504 as needed according to the desired implementation.

Figure 15:
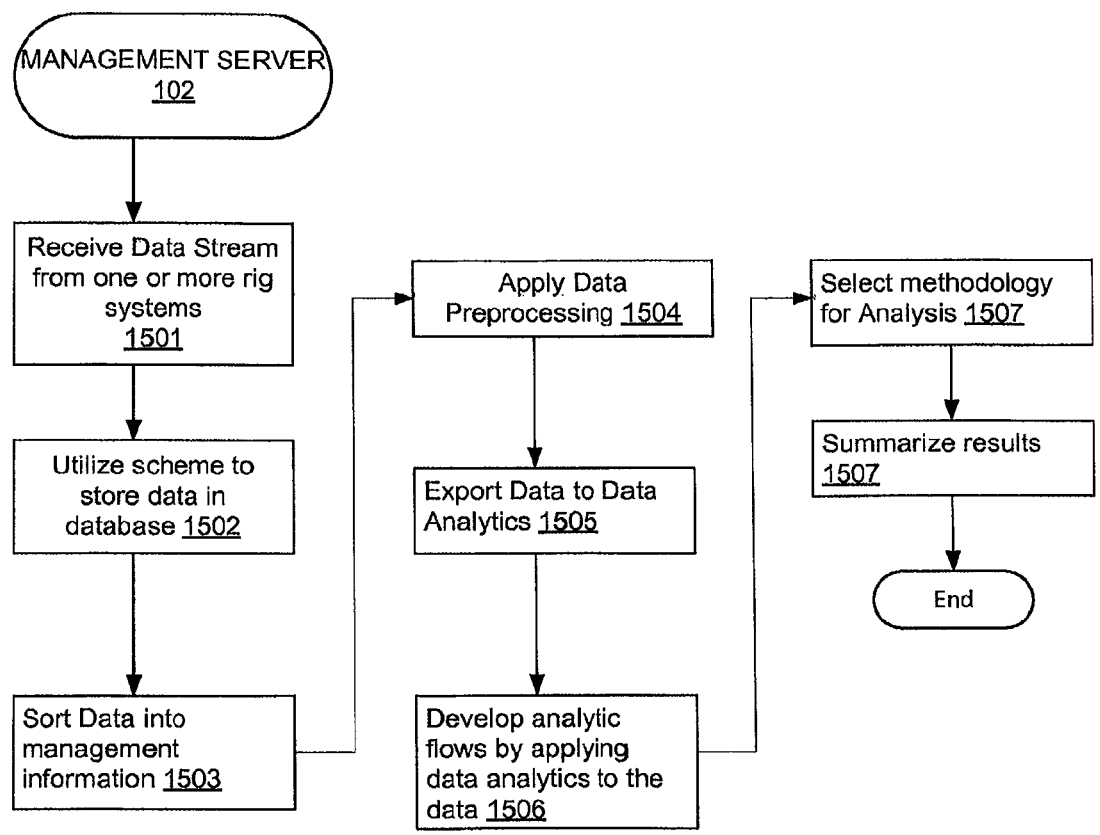
Figure 16:
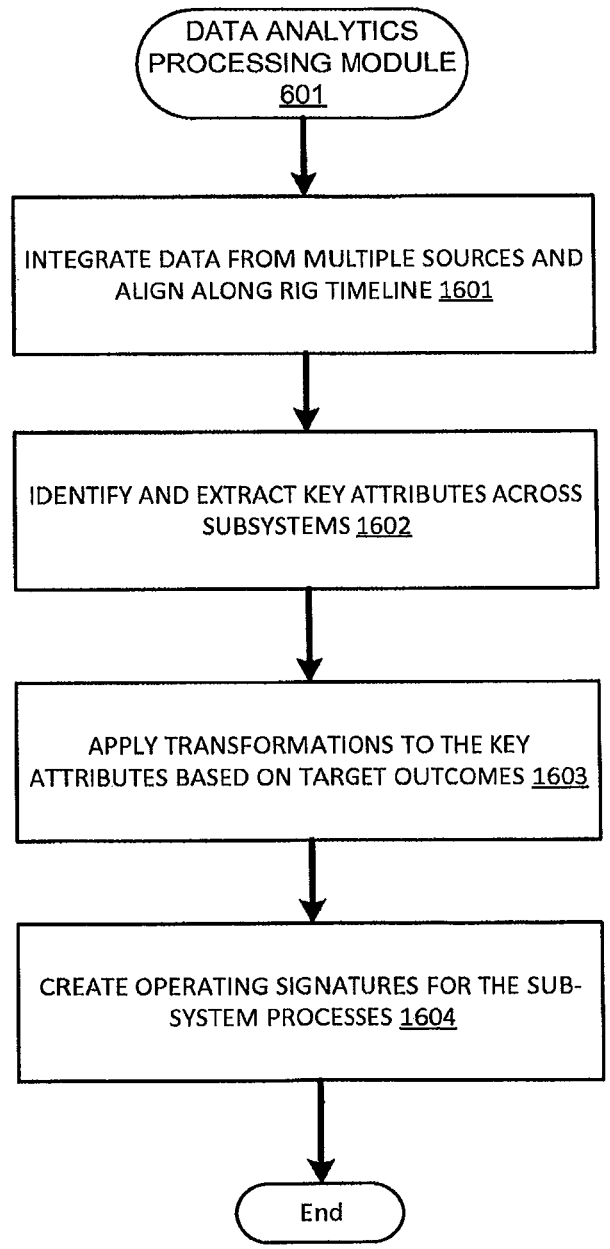
Figure 17:
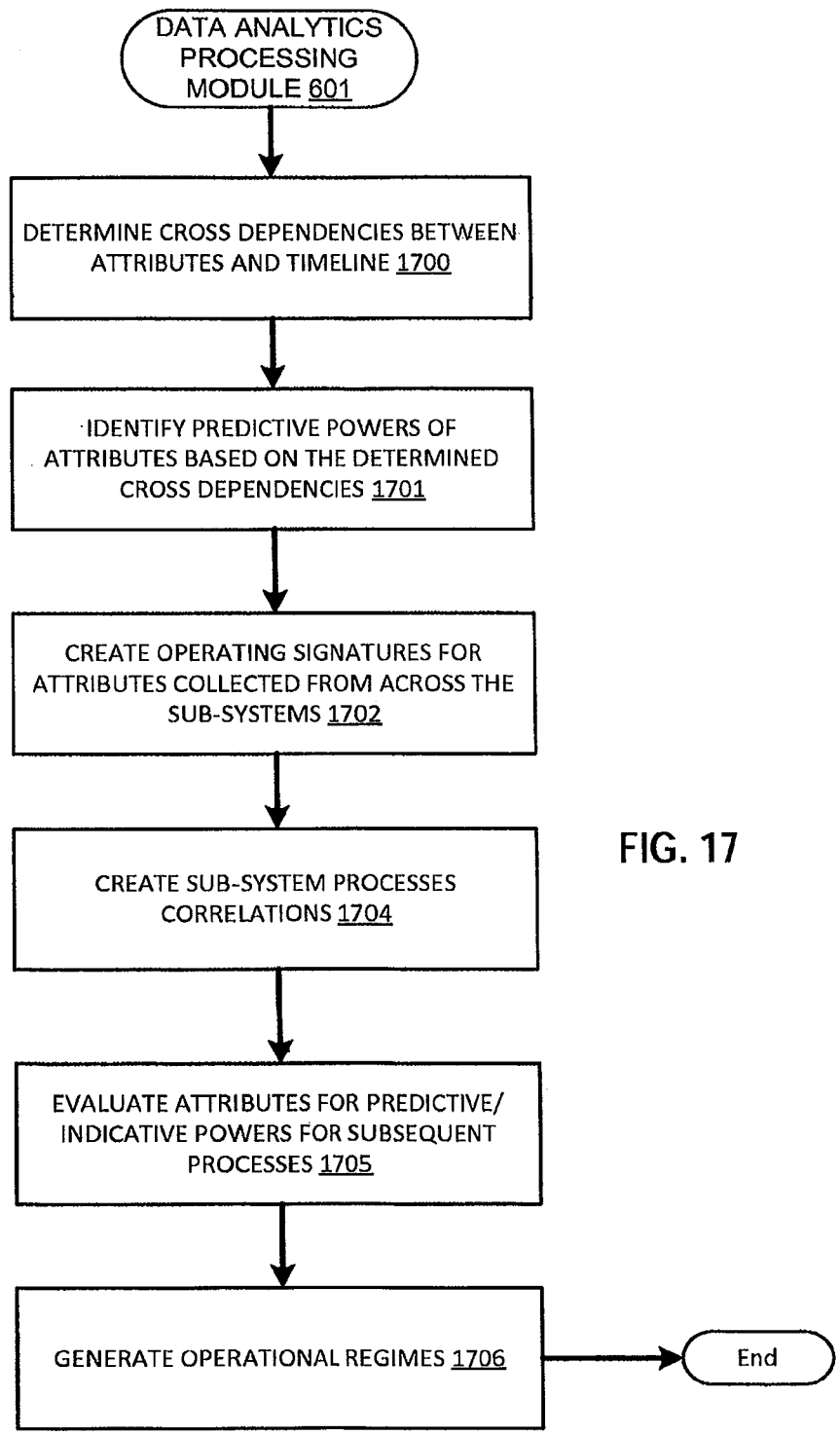
Figure 18:
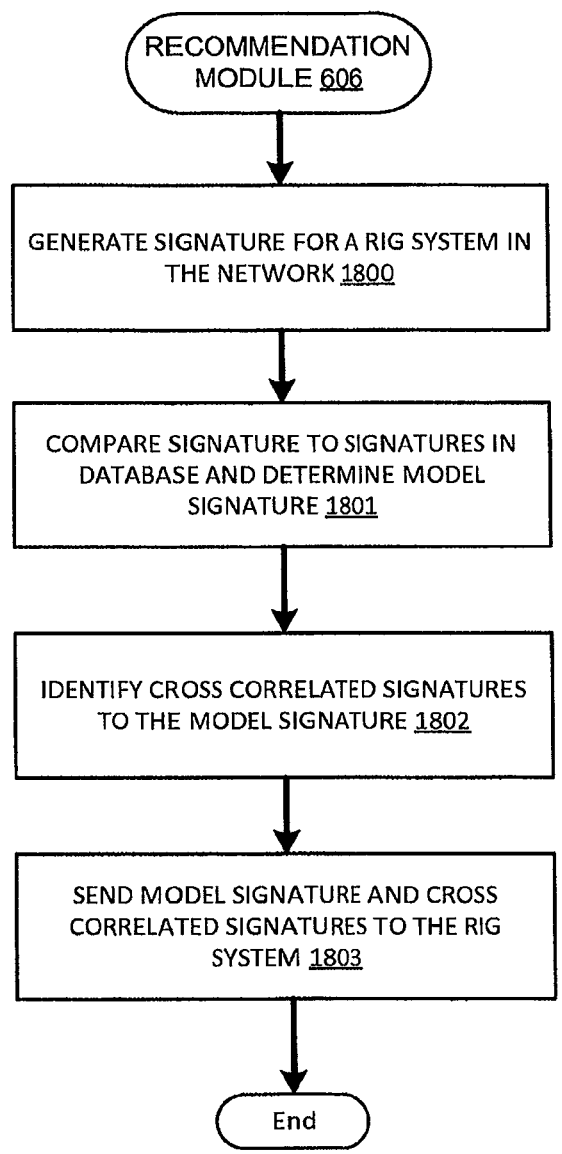

FIG. 8(*c*) illustrates an example flow diagram between the application dashboard of a rig system and a management server, in accordance with an example implementation. At 850, the rig operator may use the user interface in the application dashboard module 503 to enable the streaming of rig data to the management server. At 860, the management server receives the data and stores the data in the database for future analytics. At 870, the rig operator may request the management server for recommendations for the rig system. At 880, the management server performs the analytics as illustrated in FIGS. 15-17 and sends the recommendations as illustrated in FIG. 18.

Figure 9:
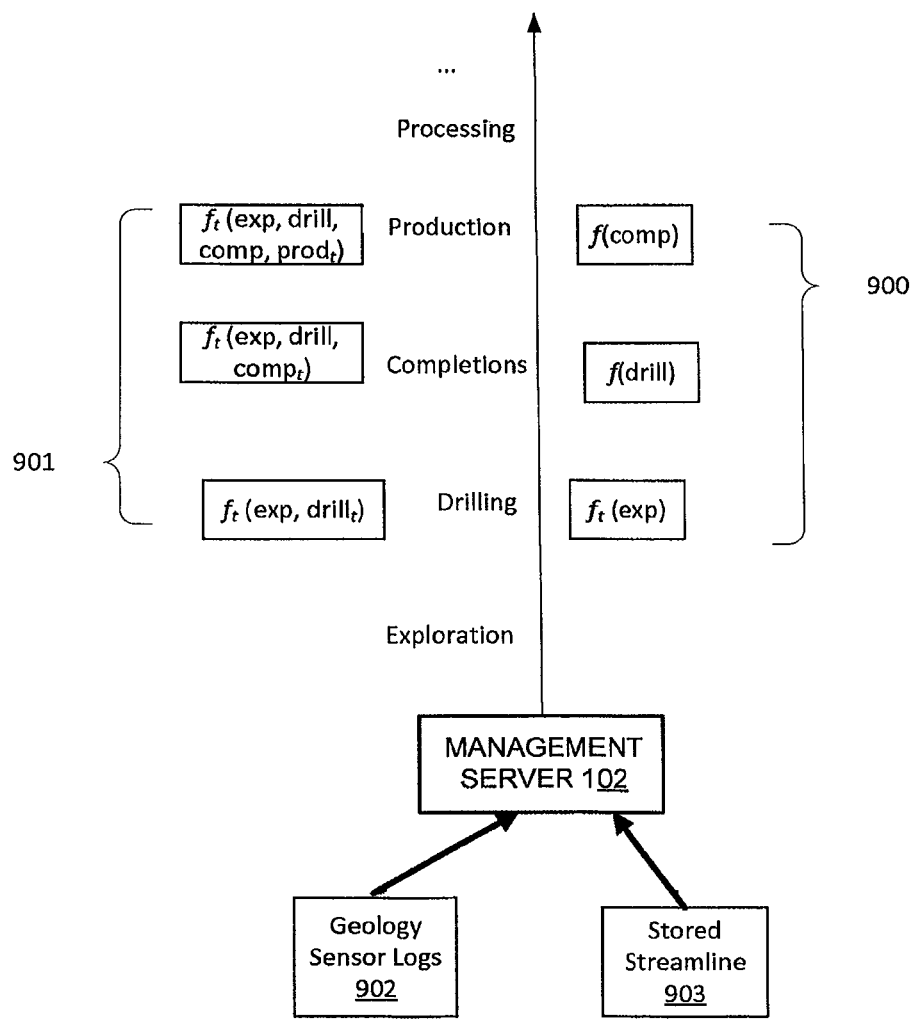
FIG. 9 illustrates an example of hybrid analytics along a timeline, in accordance with an example implementation.

FIG. 9 illustrates a hybrid analytics timeline, in accordance with an example implementation. The management server 102, by using the analytics architecture as illustrated in FIG. 8(a) with data from the database 103 such as geology sensor logs 902 and stored streamline data 903, can determine cross dependent attributes across the timeline as shown at 901. If data analytics are not applied, then cross dependencies may not be available as shown at 900 where each phase in the timeline corresponds to its own functions and attributes. For many applications, hybrid analytics that are able to handle data types with varying characteristics are therefore utilized by example implementations for improving the accuracy of prediction. These analytics may include production characterization in the oil & gas domain, and characterization models developed over geology, sensor, and log data. Further aspects of determining cross correlated attributes across the timeline is described with respect to FIG. 16 and FIG. 17.

FIGS. 10(a) to 10(e) illustrate examples of management information utilized by the management server, in accordance with an example implementation. Such information may be stored in the memory 402 and may be referred to when the processor 401 executes one or more modules stored in the memory 402.

FIG. 10(a) illustrates an example of data received from one or more rig systems and processed using data preprocessing as illustrated in FIG. 12, FIG. 13 and FIGS. 15-17 for forming a management table. As illustrated in FIG. 8(a), well data 801 is streamed to the management server 102 and then processed for various features and attributes. The identity of the rig system sending the corresponding well data is extracted from the data as the Rig ID, and the raw data is attributed to a timeline according to FIG. 1(b) and an associated data attribute or variable name. The Rig ID example in FIG. 10(a) is directed to an American Petroleum Institute (API) well number, but other IDs may be utilized depending on the implementation of the management server 102. The data can be in any form, such as sensor measurements, log data, manual log entries or notes from the log operator as described in further detail with respect to FIG. 13. The example table as illustrated in FIG. 10(a) is one of many possible implementations and other variations are also possible depending on the desired implementation. For example, time stamps, identity of the corresponding sensor subsystem and other information may also be incorporated, depending on the desired implementation.

FIG. 10(b) illustrates an example of management information for generating recommended signatures for the one or more rig systems, in accordance with an example implementation. In this example, each rig system is categorized by a Rig ID, and the data attributes are associated with the timeline and the subsystem for generating a signature. Recommended or model signatures can be generated for each of the rig systems from analytics performed in the flow diagram of FIG. 18 and stored. In another example implementation, recommended signatures may also be retrieved from the database for classes of rig systems having similar characteristics. For example, when a recommended signature is determined for one rig system, that recommended signature can be utilized for other rig systems having similar characteristics and adopted accordingly.

FIG. 10(c) illustrates a management of a set of key attributes for each timeline phase from FIG. 1(b), in accordance with an example implementation. By applying analytic flows, the management server may identify key attributes that affect each of the phases in the timeline. The key attributes can be derived based on the data analytics performed in example implementations as described herein. Key attributes may be initially entered manually or by other methods such as being derived from one or more models supplied by the management server operator, and then automatically updated based on new data from rig systems and/or analytics applied to past rig systems through learning based methods, as illustrated in FIG. 16 and FIG. 17.

FIG. 10(d) illustrates the management of identified key attributes with the subsystems of the rig system. Once the key attributes are identified in FIG. 10(c), the corresponding subsystems can be determined for each of the attributes.

FIG. 10(e) illustrates the management of independent and dependent variables across subsystems, in accordance with an example implementation. The independent and dependent variables can be determined from the analytics as illustrated in FIG. 17, and initialized from manual entry from the management server operator or derived from one or more models.

Figure 11A:
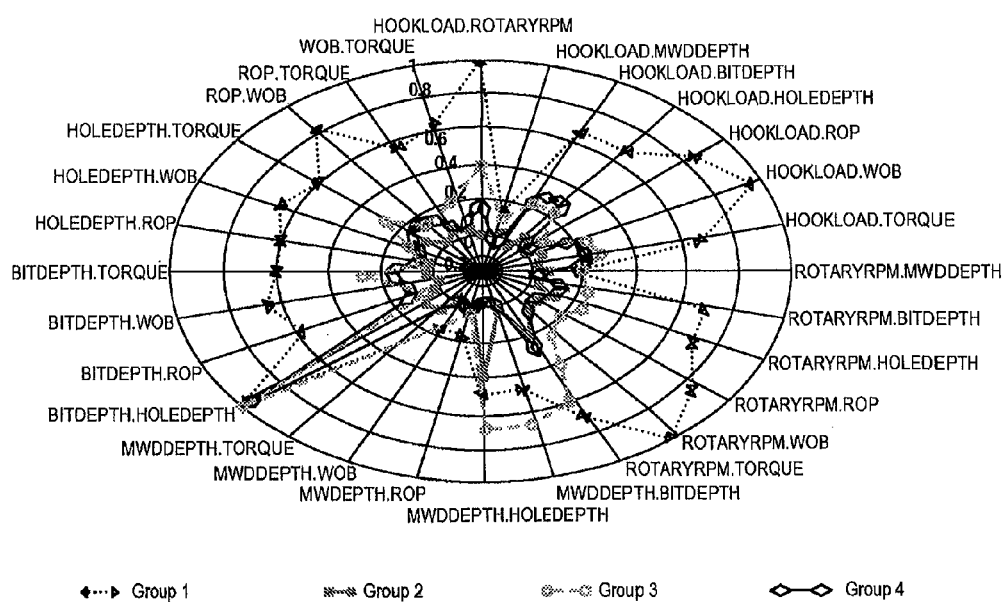
FIGS. 11(a) to 11(c) illustrate examples of rig signatures, in accordance with an example implementation.
Figure 11B:
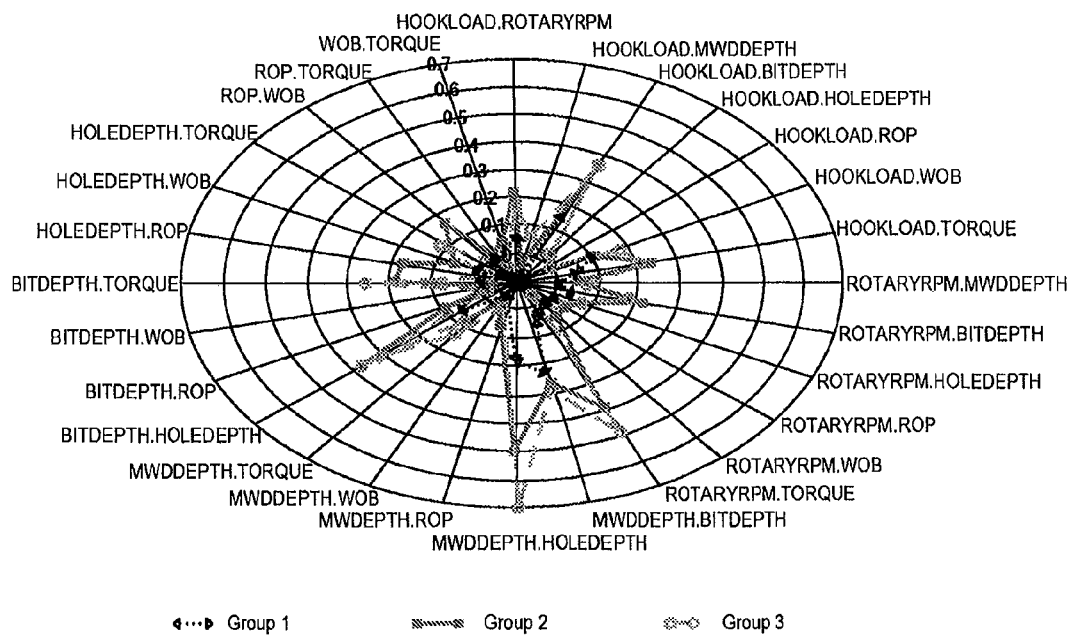
Figure 11C:
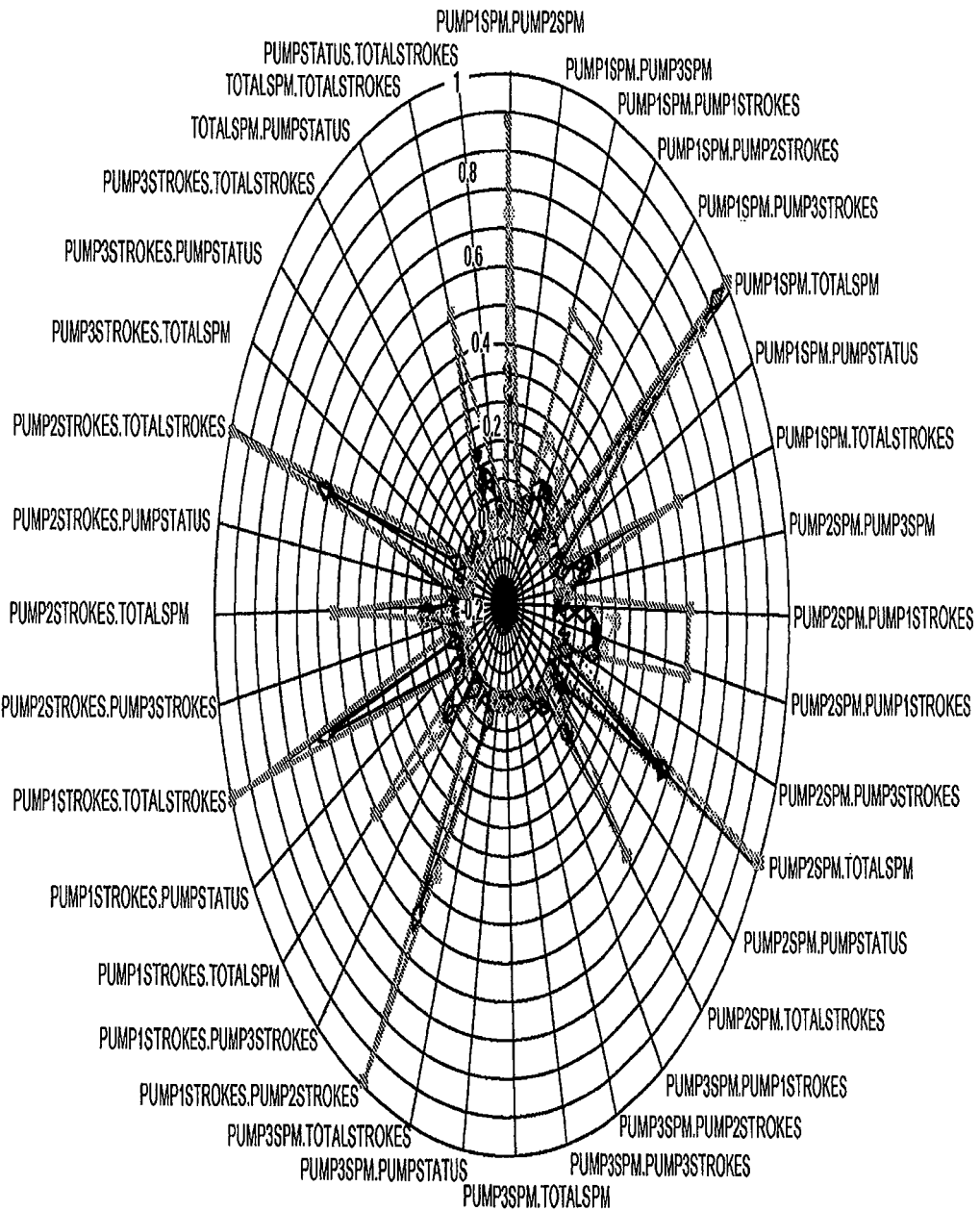

FIGS. 11(a) to 11(c) illustrate examples of rig signatures, in accordance with an example implementation. In the example of FIG. 11(a), a drilling signature is illustrated along with key attributes with respect to the drilling phase in a spider graph. The attributes illustrated are related to variables of various sensor arrays, such as the sensor arrays for measurement while drilling (MWD), hookload, drill bit depth, hole depth, and so on. The signatures of four different systems are illustrated. In FIG. 11(b) an example signature for the drilling subsystem is illustrated in a similar manner as a spider graph. In FIG. 11(c) illustrates an example signature of the circulation subsystem, in accordance with an example implementation. Although the signatures are represented in spider graph form, other forms may be utilized (e.g., bar graphs, etc.) depending on the desired implementation, and the signatures are not limited to a spider graph form.

Figure 12:
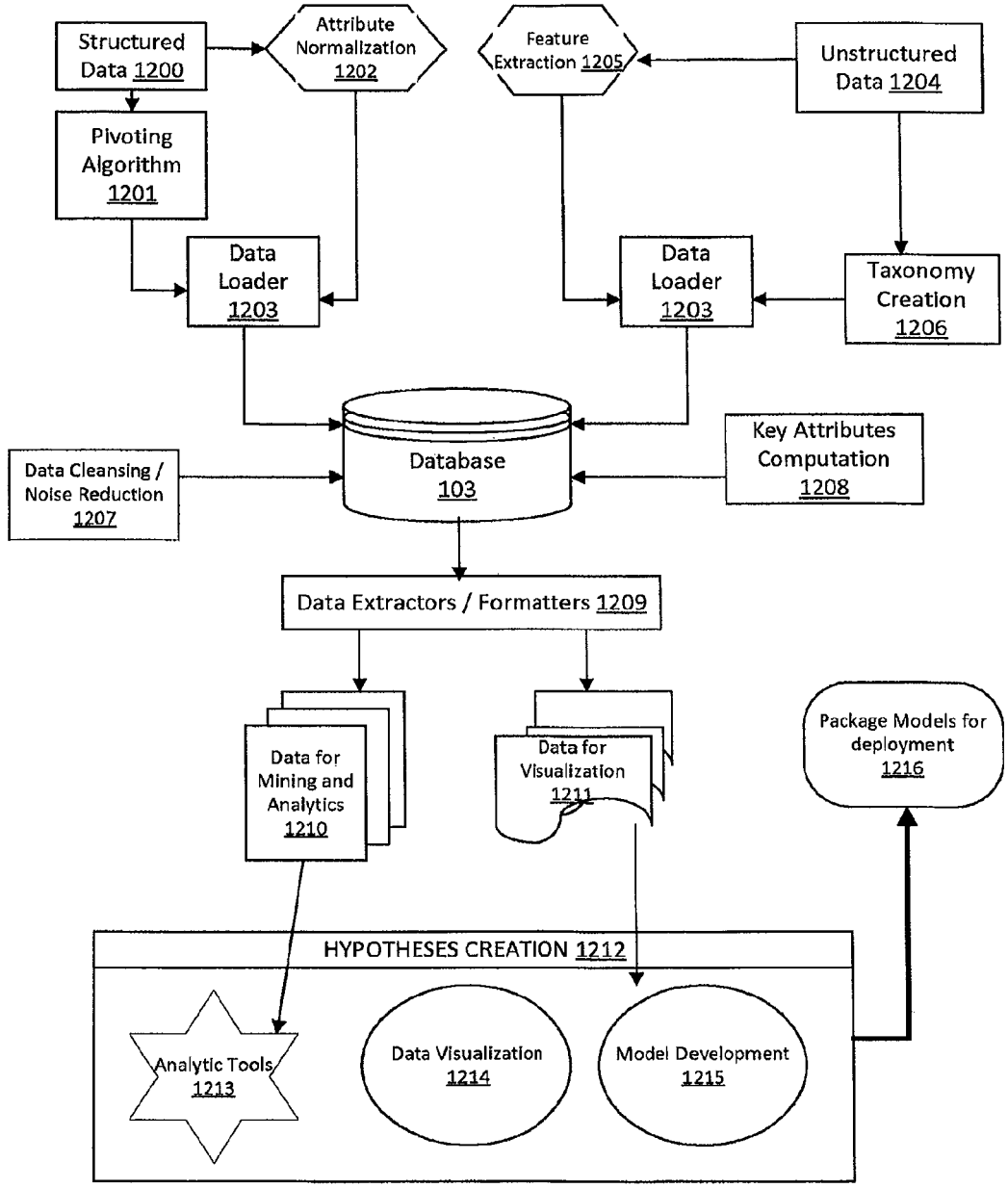
FIG. 12 illustrates the example flow of data processing in the system, in accordance with an example implementation.

FIG. 12 illustrates the example flow of data processing in the system, in accordance with an example implementation. Rig nodes may send structured 1200 or unstructured data 1204 to the management server 102. Structured data 1200 can include data such as time logs and sensor data logs. Attribute normalization 1202 may be used to normalize the attributes along a timeline and a pivoting algorithm 1201 may be employed. The pivoting algorithm may be configured to automatically sort, count total or give the average of the data stored in the time logs and the second logs and generate pivot tables which can form the basis of the management information as illustrated in FIGS. 11(a) to 11, as well as for generating un-weighted cross tabulations.

For unstructured data 1204 such as document files or spreadsheet files, a feature extraction 1205 may be applied to determine the features within the files. A taxonomy creation 1206 may be conducted to determine a classification schema for categorizing the unstructured data.

Both structured data 1200 and unstructured data 1204 are processed by a data loader 1203, which is configured to perform ETL functions (Extract Transform and Load) to load the meta-data and the data into a database for both structured and un-structured or semi-structured data sets. This process allows for the leveraging of features (attributes) extracted from a combined source of inputs such as sensor data time series and the operator logs notes. The data loader 1203 loads the data into the database 103 and data cleansing/noise reduction processes 1207 and the computation of key attributes 1208 may be performed. Data extractors and formatters 1209 may be used to extract data for mining and analytics 1210 and for visualization 1211. The mining and analytics 1210 utilize analytic tools as described in FIG. 8(*a*) to determine predictions and recommendations for the rig system. The visualization 1211 is for the generation of a model signature as well as a rig system signature.

During the analytics aspect, a hypothesis creation 1212 may also be done to determine better models for the rigs based on received feedback. The hypothesis creation 1212 can involve the use of analytic tools 1213, data visualization 1215 and model development 1215. Analytic tools as described in FIG. 8(*a*) can be applied across the database of rig systems for both the rig system associated with the management server and for historical rig system data imported from other sources. From the analytics, the key attributes management information of FIG. 10(*c*) may be updated. The models may be packaged and sent to the rig systems accordingly as shown at 1216.

FIG. 13 illustrates an example high level architecture of data analytics, management and feedback to rig systems in accordance with an example implementation. As illustrated in FIG. 8(*a*) and FIG. 12, various kinds of data 1300 are sent such as sensor data, context data which can be structured or unstructured, and log/event data. Within the management server 102, the data analytics processing module 601 may have the following, a studio library 1301, an orchestrator 1302, an analytics and visualization engine 1303, data management 1304, and a data storage 1305. The studio 1301 may be managed by the process knowledge module 603 which can include a standard development kit (SDK) package, a data flow designer and an experiment designer. Other functions that can be included include functions for metrics, for key performance index and key metrics index information, process discovery models, process, timing and rules information, pattern tagging and model mapping functions, and operations characterization functions developed for rig systems. These tools can be used and modified by the application designer or data scientist as desired. The orchestrator 1302 may also be managed by the process knowledge module 603 and can contain functions for a data flow optimizer, an operator scheduler and a data flow executor.

The data streamed into the analytics and visualization engine 1303 and processed by a smart ingestion system 1303-1 that handles the intake of the data 1300 from the various rig systems. Examples functions within the smart ingestion system 1303-1 include data extraction, ETL/data fusion and indexing to provide for computation of the data stream. The smart ingestion system 1303-1 will conduct data extraction and and apply ETL/data fusion functions such as the taxonomy creation 1206 and pivoting algorithm 1201 for structured and unstructured data. The data is also indexed using ontologies.

The data is streamed and can go through a stream compute system 1303-2 which can also perform batch computations on the data stream through the batch compute system 1303-3. The data received from the one or more rig systems is processed by the stream compute system 1303-2 for pattern and event detection, and aggregated into the database by the aggregation function. The pattern and event detection can depend on models stored in the database as described in FIG. 8(*a*).

The batch compute 1303-3 may include features such as machine learning, data mining and natural language processing (NLP). Data mining is applied by the data management 1304 for processes such as data smoothing and removal of anomalous entries. Natural language processing may be used for parsing text entries and comments made by the rig system operator and determining the categorization of ambiguous strings of data.

For the hybrid compute system 1303-4, hybrid analytics are applied as described in FIG. 8(*a*). Example functions within the hybrid compute system 1303-4 models include diagnosis of situations of the rig node systems, root cause analysis to determine attributes, correlation analysis to determine cross dependent attributes, prediction analysis to forecast production and NPT of a rig system over the timeline, and also query and search functions to compare other historical rig systems to compare with the rig systems in the network. The diagnosis function and root cause analysis can involve the determination of model signatures and comparison to the rig signature of a rig system. Correlation functions can determine new correlations and update management information regarding key attributes to be analyzed as illustrated in FIG. 17. Prediction functions can involve extrapolation of the rig system signature and providing an expected NPT or production output. The query and search function can retrieve data from other rig systems in the database having similar characteristics to the rig systems associated with the data stream.

To manage the data, the management server 102 may employ data management architectures 1304 which can include a relational database management system (RDBMS), a knowledge visualization systems (KVS) tool and a graph store 1304-3.

The database 103 manages the data store layer 1305, which can include a file system 1305-1, a distributed file system 1305-2, and a memory grid 1305-3 which facilitates the transfers of data across all rig systems associated with the management server 102, as well as providing access to management server operators.

The output for the analytics architecture can be interactive visual insights 1306-1, predictions 1306-2, recommended actions 1306-3, and automated actions 1306-4. The visual insights 1306-1 may be in the form of graphs that indicate the signature of one or more rigs that can be switched through as illustrated in FIGS. 11(*a*) to 11(*c*). Predictions 1306-2 can be provided to each rig as to the expected production based on the data. Recommended actions 1306-3 can be provided by comparing a rig with a model rig signature and instructing the rig system to adjust parameters to the model signature. Automated action 1306-4 may also be sent to the rig nodes. The overall process is further illustrated in FIG. 15.

FIGS. 14 to 19 illustrate example flow diagrams of the management server, in accordance with example implementations.

Figure 14:
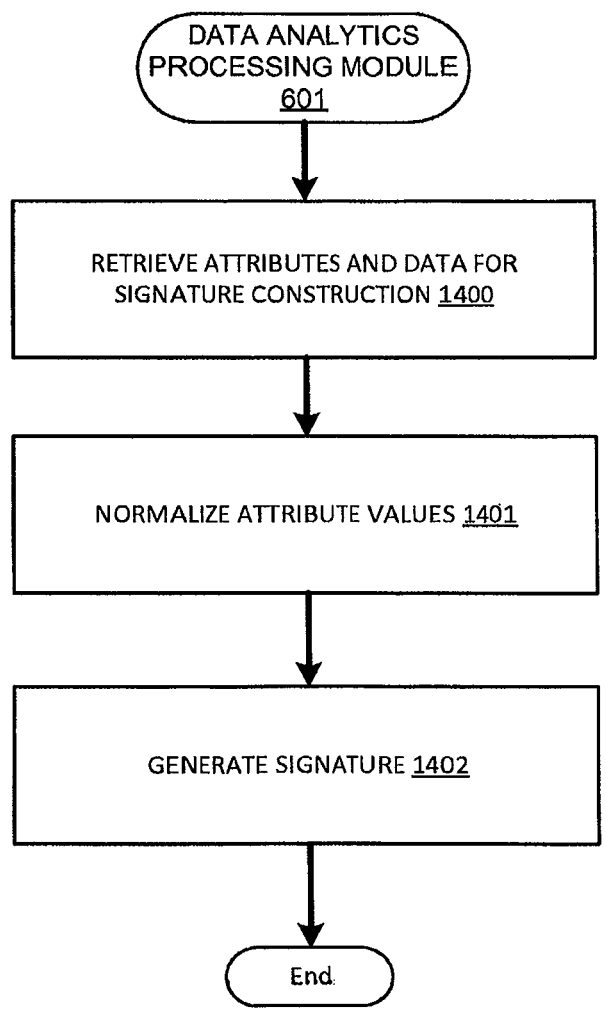
FIGS. 14 to 19 illustrate example flow diagrams of the management server, in accordance with example implementations.

FIG. 14 illustrates an example flow diagram for generating operating signatures in accordance with an example implementation. The example flow can be used to generate operating signatures as desired. At 1400, attributes and their associated attribute values are retrieved for signature construction. The attributes used may be the key attributes as identified in the flows of FIG. 16 and FIG. 17 and as stored in the management information of FIGS. 10(*c*) and 10(*d*), and the associated data values can be determined from management information as illustrated in FIG. 10(*b*). At 1401, the attribute values are normalized over a range of expected values for the attribute. At 1402, the signature is generated as illustrated in the examples of FIGS. 11(*a*) to 11(*c*).

FIG. 15 illustrates an overall flow diagram of the management server 102. At 1501, the management server receives a data stream from one or more rig systems. The source of the data stream can be a bit stream through the network and can include spreadsheet files or raw data from sensors. Additionally, information regarding previously managed rigs can also be uploaded to the management server. For example, if the information of a past rig is compiled into a format readable by the management server, then information regarding the past rig can be included in the database after processing by the management server. At 1502 a scheme may be employed to store data in the database 103 by using one or more functions in the smart ingestion system 1303-1, according to the desired implementation.

At 1503 data is processed and sorted into management information as illustrated in FIGS. 10(a) and 10(b). Management information columns can include Rig ID, a timestamp, and attributes. Attribute names can be determined for the drilling, circulation, and other subsystems of the rig along with other attributes such as completion systems attributes, frack operations attributes, micro-seismic attributes, production systems attributes and so on, depending on the desired implementation.

At 1504, the management server 102 may apply data preprocessing. This can include deleting invalid data such as data that falls outside expected or possible ranges. Other data preprocessing can be the computation of missing values or other values based on values received. Additionally, ontology and associated dependencies may be loaded by determining the key attributes based on management information stored in FIGS. 10(c) to 10(e), as well as the cross dependent attributes. Further details of the flow for the data preprocessing can be found with respect to the description of FIG. 16.

At 1505 the management server 102 may then export data to the data analytics module export data to data analytics processing module 601 which can utilize the analytics as illustrated in FIG. 8(a) and FIG. 12. The data is converted to a format that can be utilized by data analytics tools and variable properties can be specified (e.g., character, numeric, width, etc.).

At 1506 the management server 102 may then apply analytic flows to data. The analytic flows may be conducted by utilizing analytic tools and application services as illustrated in FIG. 8(a) and FIG. 12. The operator library may provide support for a standard interface to analytics tools, platforms or systems. Statistics are compiled by utilizing the analytic tools. Data quality issues may also be identified and highlighted, data smoothing can also be employed to remove noise from the data and identify statistical outliers. Further, plots may be used to determine relationships between attributes. From the relationships, dependent and independent attributes may be determined. The management server 102 may also load ontology and associated dependencies for semantics.

At 1507, the management server 102 applies one or more methodologies for analysis. Such analysis can include linear regression, logistic regression, analysis of variance, multivariate analysis of variance, time series analysis, and support vector machines (SVM). Analysis can involve using predictive analytics to determine the expected NPT or production output of the rig system, and can include determining if rig systems fall within a class of rig systems for which a model signature in the database exists. The analysis listed above can be changed depending on the desired implementation.

At 1508, the management server 102 can summarize the findings and export the findings in the form of outputs as illustrated in FIGS. 12 and 13. Outputs can be in the form of spreadsheet files for use by the application dashboard module 503 of the rig node and can include tabulated results. Findings and recommendations may also be summarized in a format that can be presented to the rig node operator through the application dashboard module 503. For the findings and recommendations, salient discoveries may also be highlighted. An example of a recommendation and model package is described with respect to FIG. 17.

FIG. 16 illustrates an example flow of the data preprocessing 1504, in accordance with an example implementation. In the example flows of FIG. 16 and FIG. 17, descriptive methods for predictive modeling are applied by using supervised and unsupervised learning based model creation.

At 1601, the data analytics processing module 601 may integrate and ingest data from multiple rig systems and align the received data sets along the rig timeline as illustrated in FIG. 10(a). For example, the phases as illustrated in the timeline of FIG. 1(b) may be used as the basis to determine the correspondence between each of the data points and each of the phases in the timeline. The data is aligned and across aligned processes and sub system outline. For example, attributes relating to the drilling phase are aligned for the drilling phase as well as affected phases and/or subsystems such as the mechanical subsystem during the drilling process and the circulation subsystem during the drilling process. In addition, an attribute relating to a particular phase may affect or be affected by another phase.

At 1602, the key attributes are extracted across the subsystems from both structured and unstructured sources for each associated rig system to create management information tables such as the information table illustrated in FIG. 10(b).

At 1603, specific transformations are applied based on the target outcomes. For example, data smoothing may be applied for sensor reading discrepancies, missing data or equipment calibration information related transformations. The types of transformations that can be applied are described with respect to FIGS. 6 and 13.

At 1604, operating signatures for the sub-system processes are created from the information of FIG. 10(b), to form signature information as shown in FIGS. 11(a) to 11(c). For example, the management server 102 can create drilling signatures, production signatures or completions signatures for independent processes. Recommendations for each particular rig system can then be generated based on the flow as illustrated in FIG. 18.

FIG. 17 illustrates an example flow diagram for determining cross dependent attributes as illustrated in the management information of FIG. 10(e). The flow diagram may be implemented as part of the application of data analytics to the data as described at the flow 1506 of FIG. 15. The example of FIG. 17 can be utilized for updating the key attributes and the management information as illustrated in FIGS. 10(c) and 10(d) as well as the information regarding independent and dependent variables as illustrated in FIG. 10(e). Additionally, the flow at FIG. 17 may be executed periodically on rig data stored in the database or manually initiated by the management server operator, depending on the desired implementation. For example, the flow diagram at FIG. 17 may be executed in the background by the management server to update the set of key attributes At 1700, cross dependencies can be discerned between the various data linked to the preceding process to have an impact on the processes along the timeline of FIG. 1(b). In an example implementation, data analytics may construct models to leverage drilling signatures in combination with geological data analysis and rock porosity and permeability detection to indicate a strong predictive signal for production curve decline estimation.

At 1701, predictive powers of the attributes associated with each subsystem are determined Supervised learning methods such as Markov modeling, logit regression, naive Bayes or decision tree techniques can be applied to the data. Information Gain (IG) derived from the machine learning methods can aid in dimension reduction process for reducing the number of random variables under consideration. Information gain measures the amount of information in bits about the class prediction, if the only information available is the presence of a feature and the corresponding class distribution. Concretely, the IG measures the expected reduction in entropy (uncertainty associated with a random feature). Given SX the set of training examples, xi the vector of ith variables in this set, |Sxi=v|/|SX| the fraction of examples of the ith variable having value v:

$$IG(Sx, xi) = H(Sx) - \sum_{v=values(xi)}^{|Sxi=v|/|S\_X|} H(Sxi = v) \text{ with entropy:}$$

$$H(S) = -p+(S)\log_2 p+(S) - p-(S)\log_2 p-(S)$$

p±(S) is the probability of a training example in the set S to be of the positive/negative class. The method may apply apriori knowledge and correlation between item sets and class attributes to compute all positive and negative class association rules from the training dataset. For example, the presence or absence of a mineral or a geological structure may have an impact on the production volumes. The correlations may be computed between process operations variables(dependent) and the associated production volume characteristics (independent). When correlations are determined, the management information for the key attributes as illustrated in FIGS. 10(*c*) and 10(*d*) can be updated.

At 1703, operating signatures are created for attributes collected from across the sub-systems. Signatures are created by utilizing the flow from FIG. 14 based on the sub-systems and the identified attributes.

At 1704, cross sub-systems process correlations are generated by aligning the processes sequentially from determining the subsystems of the correlated attributes. At 1705, an evaluation is performed to determine if attributes of the preceding process are indicative/have predictive powers for subsequent processes and/or subsequent sub-system process behaviors as illustrated in FIG. 9. In addition, while FIG. 9 illustrates attribute influence in one direction as an example, it should be understood that an evaluation may be performed to determine if attributes of a subsequent process are indicative/have predictive powers for a preceding process. The analytics performed here can be based on analytics tools and application of analysis such as linear regression, logistic regression, analysis of variance, multivariate analysis of variance, time series analysis, and support vector machines (SVM), and so on, and applied to multiple attributes over multiple phases in the timeline. The analytics can also be conducted to find the correlation of such attributes as they affect NPT or production output. For example, if attributes related to the drilling phase for one subsystem affect another attribute in another subsystem for the production and further affect NPT or production output, then the management information of FIGS. 10(*c*), 10(*d*) and 10(*e*) are updated to reflect the correlations. From the analytics performed at this flow, the management information of FIGS. 10(*c*), 10(*d*) and 10(*e*) can be updated to include the correlated attributes. For example, the management information at FIG. 10(*c*) may be modified so that the set of key attributes include attributes that affect multiple phases in the timeline, and may therefore appear at multiple phases within the management information.

At 1706 sub-process operational regimes and models from the above mentioned supervised learning based methods are generated for future use. For example, models can be stored between various attributes indicative of their correlations for further use. Attribute values leading to lengths of NPT beyond a threshold may be stored for future use in detecting rig systems that have similar attribute values and immediately initiating automated actions 1306-4 to change the values at a rig system.

From the generation of management information through the use of these flow diagrams, recommendations may be generated and sent to the associated rig systems. For example, the models in the form of the information tables of FIGS. 10(*c*) to 10(*e*) may be packaged into analytical operator packages and deployed to the rig nodes for near line event detection and behavior detection. For example, the early warning system module of the rig nodes may receive updated dependent attributes and apply the updated dependent attributes to the rig node. In addition, model rig signatures may be derived based on analytics conducted on the attributes of the rig system and then sent to the rig system as a recommendation.

FIG. 18 illustrates a flow diagram for generating and sending a model signature in accordance with an example implementation and is an example of the flow at 1508. The signatures can be generated using the flow from FIG. 14. At 1800, a signature is constructed for a rig system within the network of the management server. At 1801, the signature is compared to signatures of other rig systems based on data stored in the database. The data stored in the database can include other rig systems within the network as well as historical data from previous rig systems. Additionally, the data can include rig system data input from the operator of the management server as desired. The signatures retrieved can encompass some or all of the rig systems, depending on the desired implementation. For example, filtering may be employed to compare the signature to the signatures of other rig systems that have similar characteristics. From the signatures, a model signature may be derived based on the application of analytics, which utilize the determined key attributes to determine values that reduce NPT or increase production. The model signature can be stored in the management information as illustrated in FIG. 10(*b*) for future reference and can be used for other rig systems with similar characteristics. At 1802, subsystem signatures that are cross correlated with the model signature are also derived based on the dependent variables as illustrated in the management information of FIG. 10(*d*) and FIG. 10(*e*). Once the signatures are determined, the model signature and cross correlated signatures can be sent to the corresponding rig system as shown at 1803. The model signature can be utilized by the application dashboard 503 of the rig system as an interactive visual highlight 1306-1, and can be indicative of recommended actions 1306-3 or can also be implemented as an automated action 1306-4 for certain subsystems of the rig system.

Based on the analysis and modeling as illustrated in FIG. 18, example implementations may recommend the corrective action in the operations. For example, in reference to the drilling signature example of FIG. 11(*b*), the model signature derived in the example is indicated as group 2, with the rig system to receive the recommendation designated as group 1. The model signature illustrated in FIG. 11(b) is a signature that can be applied to rig systems with similar characteristics. Adapting the drilling signatures from group 1 to group 2, which due to the cross correlated attributes results in changing the circulation system signatures from group 1 to group 2 can help improve the production characteristics of the well of the rig system associated with the group 1 signature. From observing and analysis of historical data, example implementations can develop drilling signatures for both sub-space circulation or mechanical and cross process operations, as well as combined drilling or completions processes for different classes of drilling or other process operations. Example implementations can involve observing the effects of each group of signatures over a target observation or topic of interest such as drilling non-productive time or production decline curve trends and develop the causal models for known or discovered behaviors. These recommendations can be sent to the corresponding rig system.

In an example implementation, the signatures can be processed from a rig system in the network from live streaming data from the operations. The signatures can then be classified and compared to the other signatures and based on the outcome of the comparison the management server can recommend the correct course of action by understanding which features (attributes) need to be changed to move the signature of operations from a non-desired state to a desired state to meet the target outcome.

FIG. 19 illustrates the flow diagram for generating output for rig systems, in accordance with an example implementation and is an example of the flow at 1508. At 1900, the type of desired support is retrieved from the request for recommendation 870 from the rig system. The types of support can be specified in the request as at least one of operations and maintenance support 702, capacity and logistics support 703, process management 704, and decision support 705 as illustrated in FIG. 7.

At 1901, based on the analysis as conducted in 1507 for the attributes corresponding to the type of support, predictive models can be packaged and sent to the rig system as prediction output 1306-2 in FIG. 13. For example, if the request is for operations and maintenance support, the predictive models can be focused on the key attributes related to the drilling phase, along with predictions of NPT and production output based on the current attribute values of the rig system. The models can be in the form of spreadsheet or document files which are processed by the recommendation processing module of the rig system.

At 1902, the model signature can be sent to the rig system based on processing conducted, for example, in FIG. 18. The model signature can be in the form of interactive visual insights 1306-1 and displayed to the rig operator through the application dashboard module 503 in the form as shown in FIGS. 11(a) to 11(c). Additionally, a summary of results can be provided with recommended courses of action 1306-3 which can be in the form of text files or instructions for the operator. Depending on the desired implementation, automated action 1306-4 may be performed on the rig system to adjust the parameters of the rig system based on the model signature.

Some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer-readable medium, such as a non-transitory medium or a storage medium, or a computer-readable signal medium. Non-transitory media or non-transitory computer-readable media can be tangible media such as, but are not limited to, optical disks, magnetic disks, read-only memories, random access memories, solid state devices and drives, or any other types of tangible media suitable for storing electronic information. A computer readable signal medium may any transitory medium, such as carrier waves. The algorithms and displays presented herein are not inherently related to any particular computer or other apparatus. Computer programs can involve pure software implementations that involve instructions that perform the operations of the desired implementation.

Various general-purpose systems and devices and/or particular/specialized systems and devices may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A management server, comprising:
a memory, configured to store:
first rig data, which includes first sensor data from first sensors in a first rig and first geological data of the first rig, provided from a first rig communicatively coupled to the management server; and
second rig data, which includes second sensor data from second sensors of one or more other rigs and second geological data of the one or more other rigs, provided from the one or more other rigs communicatively coupled to the management server; and
a processor, configured to:
extract a set of operational parameters of the first rig data and the second rig data by determining predictive powers of the operational parameters for plural phases of a plurality of phases of a timeline of rig operation including a drilling phase, a completion phase and a production phase, the set of operational parameters being adjustable parameters in the first rig and comprising a plurality of operational parameters which affect at least two phases of the drilling phase, the completion phase and the production phase for the first rig, wherein during the drilling phase, a size and characteristics of a discovery of oil or gas are determined and technical information is utilized to allow for more optimal methods for recovery of the oil or gas, during the completions phase, a drilled well is transformed into a producing well, and during the production phase, the production of oil or gas is facilitated;
generate a signature of the first rig for at least one phase of the plurality of phases of the timeline of rig operation for the first rig, the signature of the first rig generated from a relationship of the first rig data provided from the first rig to the set of operational parameters including the plurality of operational parameters which affect the at least two phases of the drilling phase, the completion phase and the production phase for the first rig;
generate a model signature for the at least one phase of the plurality of phases of the timeline of rig operation, the model signature generated from analytics of a relationship of the second rig data of the one or more other rigs in the memory to the set of operational parameters including the plurality of operational parameters which affect the at least two phases of the drilling phase, the completion phase and the production phase;
compare the generated signature of the first rig and the generated model signature; and
control the first rig by instructing the first rig to adjust the one or more extracted operational parameters of the first rig based on comparing the generated signature of the first rig and the generated model signature to improve operation of the first rig during the at least one phase of the plurality of phases of the timeline of rig operation for the first rig.

2. The management server of claim 1, wherein the set of operational parameters are identified as operational parameters correlated to at least one of reducing nonproductive time and increasing production output.

3. The management server of claim 1,
wherein the processor is configured to extract the plurality of operational parameters which affect the at least two phases of the drilling phase, the completion phase and the production phase based on analytics of the information of the one or more other rigs,
wherein the plurality of operational parameters includes at least a first operational parameter extracted from a set of values including: measurement while drilling depth, hookload, drill bit depth and hole depth.

4. The management server of claim 3, wherein the processor is configured to identify one or more operational parameters of the set of operational parameters that are cross dependent across the at least two phases of the drilling phase, the completion phase and the production phase.

5. The management server of claim 1, wherein the second rig data of the one or more other rigs in the memory is selected based on a correlation of the first rig to the one or more other rigs.

6. A non-transitory computer readable medium containing instructions for a process for a management server, the instructions comprising:
storing, in a memory, first rig data, which includes first sensor data from first sensors in a first rig and first geological data of the first rig, provided from a first rig communicatively coupled to the management server; and
storing, in the memory, second rig data, which includes second sensor data from second sensors of one or more other rigs and second geological data of the one or more other rigs, provided from the one or more other rigs communicatively coupled to the management server; and
extracting a set of operational parameters of the first rig data and the second rig data by determining predictive powers of the operational parameters for plural phases of the plurality of phases of a timeline of rig operation including a drilling phase, a completion phase and a production phase, the set of operational parameters being adjustable parameters in the first rig and comprising a plurality of operational parameters which affect at least two phases of the drilling phase, the completion phase and the production phase for the first rig, wherein during the drilling phase, a size and characteristics of a discovery of oil or gas are determined and technical information is utilized to allow for more optimal methods for recovery of the oil or gas, during the completions phase, a drilled well is transformed into a producing well, and during the production phase, the production of oil or gas is facilitated,
generating a signature of the first rig for at least one phase of the plurality of phases of the timeline of rig operation for the first rig, the signature of the first rig generated from a relationship of the first rig data received from the first rig to the set of operational parameters including the plurality of operational parameters which affect the at least two phases of the drilling phase, the completion phase and the production phase;
generating a model signature for the at least one phase of the plurality of phases of the timeline of rig operation, the model signature generated from analytics of a relationship of the second rig data of the one or more other rigs to the set of operational parameters including the plurality of operational parameters which affect the at least two phases of the drilling phase, the completion phase and the production phase; and comparing the generated signature of the first rig and the generated model signature; and controlling the first rig by instructing the first rig to adjust the one or more extracted operational parameters of the first rig based on comparing the generated signature of the first rig and the generated model signature.

7. The non-transitory computer readable medium of claim 6, wherein the set of operational parameters are identified as operational parameters correlated to at least one of reducing nonproductive time and increasing production output.

8. The non-transitory computer readable medium of claim 6, wherein the instructions further comprise extracting the plurality of operational parameters affecting the at least two phases of the drilling phase, the completion phase and the production phase based on analytics of the information of the one or more other rigs,
wherein the plurality of operational parameters includes at least a first operational parameter extracted from a set of values including: measurement while drilling depth, hookload, drill bit depth and hole depth.

9. The non-transitory computer readable medium of claim 8, wherein the instructions further comprise identifying one or more operational parameters that are cross dependent across the at least two phases of the drilling phase, the completion phase and the production phase.

10. The non-transitory computer readable medium of claim 6, wherein the second rig data of the one or more other rigs is selected based on a correlation of the first rig to the one or more other rigs.

11. A system, comprising:
a management server comprising:
a memory, configured to store:
first rig data, which includes first sensor data from first sensors in a first rig and first geological data of the first rig, provided from a first rig communicatively coupled to the management server; and
second rig data, which includes second sensor data from second sensors of one or more other rigs and second geological data of the one or more other rigs, provided from the one or more other rigs communicatively coupled to the management server; and
a processor, configured to:
extract a set of operational parameters of the first rig data and the second rig data by determining predictive powers of the operational parameters for plural phases of the plurality of phases of a timeline of rig operation including a drilling phase, a completion phase and a production phase, the set of operational parameters being adjustable parameters in the first rig comprising a plurality of operational parameters which affect at least two phases of the drilling phase, the completion phase and the production phase for the first rig, wherein during the drilling phase, a size and characteristics of a discovery of oil or gas are determined and technical information is utilized to allow for more optimal methods for recovery of the oil or gas, during the completions phase, a drilled well is transformed into a producing well, and during the production phase, the production of oil or gas is facilitated;
generate a signature of the first rig for at least one phase of the plurality of phases of the timeline of rig operation for the first rig, the signature of the first rig generated from a relationship of the first rig data provided from the first rig to the set of operational parameters including the plurality of operational parameters which affect the at least two phases of the drilling phase, the completion phase and the production phase for the first rig; and
generate a model signature for the at least one phase of the plurality of phases of the timeline of rig operation, the model signature generated from analytics of a relationship of the second rig data of the one or more other rigs in the memory to the set of operational parameters including the plurality of operational parameters which affect the at least two phases of the drilling phase, the completion phase and the production phase;
compare the generated signature of the first rig and the generated model signature; and
control the first rig by instructing the first rig to adjust the one or more extracted operational parameters of the first rig based on comparing the generated signature of the first rig and the generated model signature to improve operation of the first rig during the at least one phase of the plurality of phases of the timeline of rig operation for the first rig; and
a software, in a rig node managing the first rig, configured to execute a process for displaying information corresponding to the instructions to the first rig.

12. The system of claim 11, wherein the set of operational parameters are identified as operational parameters correlated to at least one of reducing nonproductive time and increasing production output.

13. The system of claim 11, wherein the processor is configured to extract the plurality of operational parameters affecting the at least two phases of the drilling phase, the completion phase and the production phase based on analytics of the information of the one or more other rigs,
wherein the plurality of operational parameters includes at least a first operational parameter extracted from a set of values including: measurement while drilling depth, hookload, drill bit depth and hole depth.

14. The system of claim 13, wherein the processor is configured to identify one or more operational parameters that are cross dependent across the at least two phases of the drilling phase, the completion phase and the production phase.

15. The system of claim 11, wherein the second rig data of the one or more other rigs in the memory is selected based on a correlation of the first rig to the one or more other rigs.

16. A method for a management server, the method comprising:
storing, in a memory, first rig data, which includes first sensor data from first sensors in a first rig and first geological data of the first rig, provided from a first rig communicatively coupled to the management server; and
storing, in the memory, second rig data, which includes second sensor data from second sensors of one or more other rigs and second geological data of the one or more other rigs, provided from the one or more other rigs communicatively coupled to the management server; and
extracting a set of operational parameters of the first rig data and the second rig data by determining predictive powers of the operational parameters for plural phases of the plurality of phases of a timeline of rig operation including a drilling phase, a completion phase and a production phase, the set of operational parameters being adjustable parameters in the first rig and comprising a plurality of operational parameters which affect at least two phases of the drilling phase, the completion phase and the production phase for the first rig;

generating a signature of the first rig for at least one phase of the plurality of phases of the timeline of rig operation for the first rig, the signature of the first rig generated from a relationship of the first rig data received from the first rig to the set of operational parameters including the plurality of operational parameters which affect the at least two phases of the drilling phase, the completion phase and the production phase for the first rig;

generating a model signature for the at least one phase of the plurality of phases of the timeline of rig operation, the model signature generated from analytics of a relationship of the second rig data of the one or more other rigs to the set of operational parameters including the plurality of operational parameters which affect the at least two phases of the drilling phase, the completion phase and the production phase; and comparing the generated signature of the first rig and the generated model signature; and controlling the first rig by instructing the first rig to adjust the one or more extracted operational parameters of the first rig based on comparing the generated signature of the first rig and the generated model signature to improve operation of the first rig during the at least one phase of the plurality of phases of the timeline of rig operation for the first rig.

17. The method of claim 16, wherein the set of operational parameters are identified as operational parameters correlated to at least one of reducing nonproductive time and increasing production output.

18. The method of claim 16, further comprising extracting the plurality of operational parameters which affect the at least two phases of the drilling phase, the completion phase and the production phase based on analytics of the information of the one or more other rigs,
   wherein the plurality of operational parameters includes at least a first operational parameter extracted from a set of values including: measurement while drilling depth, hookload, drill bit depth and hole depth.

19. The method of claim 18, further comprising identifying one or more operational parameters that are cross dependent across the at least two phases of the drilling phase, the completion phase and the production phase.

20. The method of claim 16, wherein the second rig data of the one or more other rigs is selected based on a correlation of the first rig to the one or more other rigs.

* * * * *